United States Patent
Shimizu

(10) Patent No.: US 10,073,472 B2
(45) Date of Patent: Sep. 11, 2018

(54) SPATIAL STABILIZATION DEVICE, SPATIAL STABILIZATION METHOD, AND STORAGE MEDIUM FOR SPATIAL STABILIZATION PROGRAM

(71) Applicant: NEC Corporation, Minato-ku, Tokyo (JP)

(72) Inventor: Motoaki Shimizu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 481 days.

(21) Appl. No.: 14/766,882

(22) PCT Filed: Feb. 17, 2014

(86) PCT No.: PCT/JP2014/000795
§ 371 (c)(1),
(2) Date: Aug. 10, 2015

(87) PCT Pub. No.: WO2014/129168
PCT Pub. Date: Aug. 28, 2014

(65) Prior Publication Data
US 2016/0004262 A1 Jan. 7, 2016

(30) Foreign Application Priority Data
Feb. 20, 2013 (JP) .................. 2013-031235

(51) Int. Cl.
*G05B 21/00* (2006.01)
*G05D 19/02* (2006.01)
(Continued)

(52) U.S. Cl.
CPC ............. *G05D 19/02* (2013.01); *G01C 21/18* (2013.01); *G05B 15/02* (2013.01)

(58) Field of Classification Search
None
See application file for complete search history.

(56) References Cited

U.S. PATENT DOCUMENTS 2,945,643 A * 7/1960 Slater .................. G05D 1/107
244/165
3,483,746 A 12/1969 Bers
(Continued)

FOREIGN PATENT DOCUMENTS

EP 0995079 B1 3/2006
JP H02-083411 A 3/1990
(Continued)

OTHER PUBLICATIONS

Extended European Search Report for EP Application No. EP14754500.8 dated Jan. 17, 2017.
(Continued)

*Primary Examiner* — Shaun Campbell

(57) ABSTRACT

Provided is a spatial stabilization apparatus that realizes high spatial stability with a single inertial sensor. The present invention includes: a first object that is rotatably connected to a moving body; a second object that is rotatably connected to the first object; means that measures angular velocity of either the moving body or the first object and outputs a first detected signal that includes one or more components of an orthogonal coordinate system that is fixed to either the moving body or the first object; means that outputs an estimated signal that is estimated or detected angular velocity with respect to a first angle of the first object in relation to the moving body: means that outputs a target angle signal of the first angle; means that outputs a target angle signal of a second angle of the second object in relation to the first object; means that outputs a second detected signal obtained by adding a signal based on the estimated signal and a signal based on the first detected signal; means that controls the first angle based on a signal based on the target angle signal of the first angle and a signal based on the first detected signal; and means that controls the second angle based on a
(Continued)

signal based on the target angle signal of the second angle and a signal based on the second detected signal.

13 Claims, 8 Drawing Sheets

(51) Int. Cl.
*G01C 21/18* (2006.01)
*G05B 15/02* (2006.01)

(56) References Cited

U.S. PATENT DOCUMENTS 4,085,440 A   4/1978   Hose

2002/0105298 A1* 8/2002 Vaassen ............... G01C 21/18
                                                    318/648

FOREIGN PATENT DOCUMENTS

| JP | H03-112680 U | 11/1991 |
| JP | 2004-361121 A | 12/2004 |
| JP | 2008-232944 A | 10/2008 |

OTHER PUBLICATIONS

International Search Report for PCT Application No. PCT/JP2014/000795, dated Mar. 25, 2014.

English translation of Written opinion for PCT Application No. PCT/JP2014/000795.

* cited by examiner

SPATIAL STABILIZATION DEVICE, SPATIAL STABILIZATION METHOD, AND STORAGE MEDIUM FOR SPATIAL STABILIZATION PROGRAM

This application is a National Stage Entry of PCT/JP2014/000795 filed on Feb. 17, 2014, which claims priority from Japanese Patent Application 2013-031235 filed on Feb. 20, 2013, the contents of all of which are incorporated herein by reference, in their entirety.

TECHNICAL FIELD

The present invention relates to a spatial stabilization apparatus, a spatial stabilization method, and a storage medium for spatial stabilization program, particularly, relating to a spatial stabilization apparatus, a spatial stabilization method, and a storage medium for spatial stabilization program, which stabilize a plurality of controlled objects that are rotatably series-connected in a space.

BACKGROUND ART

In the spatial stabilization apparatus, a fixed part and one or more controlled objects are series-connected through connection parts that each has a rotation axis where the rotation angles of the connection parts are controlled.

An example of a spatial stabilization apparatus is described in PTL 1. The spatial stabilization apparatus of PTL 1 includes an outer gimbal and an inner gimbal, as controlled objects, an outer torquer, an inner torquer, an outer servo amplifier, and an inner servo amplifier. The outer torquer drives rotation of the outer gimbal in relation to the fixed part. The inner torquer drives rotation of the inner gimbal in relation to the outer gimbal. The outer servo amplifier outputs a drive signal of the outer torquer. The inner servo amplifier outputs a drive signal of the inner torquer. The outer gimbal is connected to the fixed part in a manner rotatable around a rotation axis. The inner gimbal is connected to the outer gimbal in a manner rotatable around a rotation axis and fixed to a payload. The direction of the rotation axis of the outer gimbal is the same as the direction of the rotation axis of the inner gimbal.

PTL 1 describes two configurations (hereinafter, referred to as "Configuration 1" and "Configuration 2").

In addition to the above-described configuration, Configuration 1 further includes an inner inertial sensor that detects a rotation angle around the rotation axis of the inner gimbal in relation to the inertial coordinate system and an angle sensor that detects a rotation angle of the inner gimbal in relation to the outer gimbal.

Configuration 2 further includes, in addition to Configuration 1, an outer inertial sensor that detects a rotation angle around the rotation axis of the outer gimbal in relation to the inertial coordinate system.

The spatial stabilization apparatus of PTL 1 operates as follows.

In both Configuration 1 and Configuration 2, the inner servo amplifier is input the output from the inner inertial sensor, drives the inner torquer based on the output from the inner inertial sensor, and controls the rotation angle of the inner gimbal in relation to the outer gimbal.

In Configuration 1, the outer servo amplifier is input the output from the angle sensor, drives the outer torquer based on the output from the angle sensor, and controls the rotation angle of the outer gimbal in relation to the fixed part.

In Configuration 2, the outer servo amplifier is input the output from the outer inertial sensor and the angle sensor, drives the outer torquer based on the output from the outer inertial sensor and the angle sensor, and controls the rotation angle of the outer gimbal in relation to the fixed part.

As the result of the above operation, in the case of Configuration 1, having feedback from the inner inertial sensor, the inner gimbal is spatially stabilized using the inner servo amplifier.

Whereas, in the case of Configuration 2, having feedback from the inner inertial sensor, the inner gimbal is spatially stabilized using the inner servo amplifier. Further, in the case of Configuration 2, having feedback from the outer inertial sensor, the outer gimbal is further spatially stabilized using the outer servo amplifier, increasing the spatial stability.

CITATION LIST

Patent Literature

PTL 1 Japanese Unexamined Patent Application Publication No. 2004-361121 (pages 2-4, FIGS. 1-2)

SUMMARY OF INVENTION

Technical Problem

The technique disclosed in PTL 1 embodies a problem where the case of Configuration 1 shows lower spatial stability due to the lack of the outer inertial sensor compared with the case of Configuration 2. On the other hand, Configuration 2 has a problem where it requires an additional inertial sensor compared with the case of Configuration 1 for including the outer inertial sensor.

The objective of the present invention is to provide a spatial stabilization apparatus, a spatial stabilization method, and a storage medium for spatial stabilization program, which can realize high spatial stability with a single inertial sensor.

Solution to Problem

The spatial stabilization apparatus of the present invention includes: a first controlled object that is connected to a moving body in a manner rotatable around a first rotation axis; a second controlled object that is connected to the first controlled object in a manner rotatable around a second rotation axis; inertial detection means that measures angular velocity of either the moving body or the first controlled object and outputs a first detected angular velocity signal that includes one or more components out of three components of an orthogonal coordinate system that is fixed to either the moving body or the first controlled object; first angular velocity detection means that outputs an angular velocity estimated signal that is estimated or detected angular velocity with respect to a first angle of the first controlled object in relation to the moving body; first command generation means that outputs a target angle signal of the first angle; second command generation means that outputs a target angle signal of a second angle of the second controlled object in relation to the first controlled object; first addition means that adds a signal based on the angular velocity estimated signal and a signal based on the first detected angular velocity signal and outputs a second detected angular velocity signal; first control means that controls the first angle based on a signal based on the target angle signal of the first angle and a signal based on the first detected angular velocity signal; and second control means that controls the second angle based on a signal based on the target angle signal of the second angle and a signal based on the second detected angular velocity signal.

Advantageous Effects of Invention

According to the present invention, high spatial stability can be realized with a single inertial sensor.

DESCRIPTION OF EMBODIMENTS

The following will describe the details of the exemplary embodiments of the present invention with reference to the drawings. It should be noted that like elements are denoted by like numerals and the repeated descriptions thereof may be omitted as necessary throughout the drawings.

First Exemplary Embodiment

Figure 1:
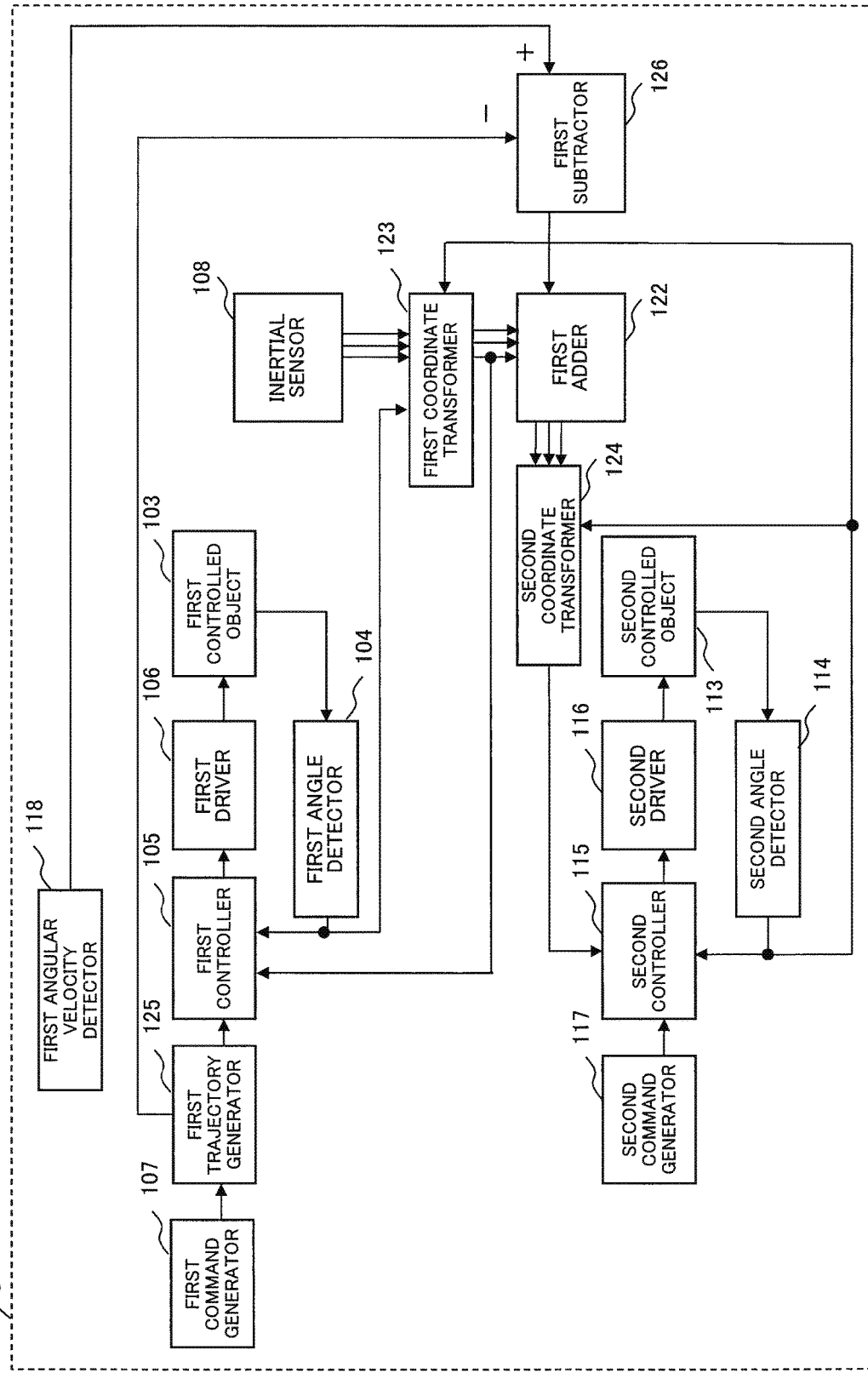
FIG. 1 is a block diagram showing a configuration of a spatial stabilization apparatus of a first exemplary embodiment of the present invention.

FIG. 1 is a block diagram showing a configuration of a spatial stabilization apparatus 100 of a first exemplary embodiment of the present invention. The following will describe a case in which a fixed part, to which the spatial stabilization apparatus 100 is attached, and a payload that is an object to be finally stabilized in a space are connected through two connection parts in a manner rotatable around each rotation axis. Hereinafter, a rotation axis of the connection part that is closer to the fixed part is referred to as the "first rotation axis" and a rotation axis of the connection part that is closer to the payload is referred to as the "second rotation axis."

The spatial stabilization apparatus 100 of the first exemplary embodiment includes: a first controlled object 103, a first angle detector 104, a first controller 105, a first driver 106, a first command generator 107, an inertial sensor 108, a second controlled object 113, a second angle detector 114, a second controller 115, a second driver 116, a second command generator 117, a first angular velocity detector 118, a first adder 122, a first coordinate transformer 123, a second coordinate transformer 124, a first trajectory generator 125, and a first subtractor 126.

The first controlled object 103 is connected to the fixed part (not shown), to which the spatial stabilization apparatus 100 is attached, in a manner rotatable around a single rotation axis (a first rotation axis).

The angle detector 104 is the first angle detection means described in Claims, which outputs a signal of an angle (hereinafter, referred to as the "first angle") of the first controlled object 103 around the first rotation axis with reference to the fixed part.

The first controller 105 is the first control means described in Claims, which is input a signal of a target angle and a detected or estimated current angle or angular velocity and outputs a signal that controls the first controlled object 103 to the first driver 106.

The first driver 106 is input a signal that controls the first angle and drives rotation around the first rotation axis (the first angle) of the first controlled object 103. Hereinafter, the coordinate system that is fixed to the fixed part is referred to as the "fixed part coordinate system" or "coordinate system 0." The fixed part is an object, to which the spatial stabilization apparatus 100 is attached, and not necessarily a still object by itself. That is, the fixed part may be a moving body, a fixture, or a controlled object of other spatial stabilization apparatus.

It should be noted that the first controller 105 may directly control the first controlled object 103. When the first controller 105 directly controls the first controlled object 103, the first controller 105 is input a signal of a target angle and a detected or estimated current angle or angular velocity and controls the first controlled object 103. Further, when the first controller 105 directly controls the first controlled object 103, the spatial stabilization apparatus 100 does not include the first driver 106.

The first command generator 107 is the first command generation means described in Claims, which outputs a signal of a target angle of the first angle.

It should be noted that the target angle of the first angle that is output by the first command generator 107 may be retained in advance by the first trajectory generator 125. When the target angle of the first angle is retained in advance by the first trajectory generator 125, the first trajectory generator 125 outputs a signal of an angle trajectory and an angular velocity trajectory to reach the target angle according to the preset target angle. Further, when the target angle of the first angle is retained in advance by the first trajectory generator 125, the spatial stabilization apparatus 100 does not include the first command generator 107.

The inertial sensor 108 is the inertial detection means described in Claims, which outputs a signal of angular velocity (hereinafter, referred to as the "fluctuation angular velocity") of three components of the orthogonal coordinate system that is fixed to the inertial sensor 108 (hereinafter, referred to as the "inertial sensor coordinate system"). It should be noted that the inertial sensor 108 is fixed to the fixed part and the inertial sensor coordinate system coincides with the coordinate system 0.

The second controlled object 113 is connected to the first controlled object 103 in a manner rotatable around a rotation axis (a second rotation axis). It should be noted that the controlled object may be a fixed part of other spatial stabilization apparatus.

The second angle detector 114 is the second angle detection means described in Claims, which outputs a signal of an angle (hereinafter referred to as the "second angle") of the second controlled object 113 around the second rotation axis with reference to the first controlled object 103.

The second controller 115 is the second control means described in Claims, which is input a signal of a target angle and a detected or estimated current angle or angular velocity and outputs a signal that controls the second controlled object 113 to the second driver 116.

The second driver 116 is input a signal of an angle that controls the second angle and drives rotation around the second rotation axis (the second angle) of the second controlled object 113 in relation to the first controlled object 103.

It should be noted that the second controller 115 may directly control the second controlled object 113. When the second controller 115 directly controls the second controlled object 113, the second controller 115 is input a signal of a target angle and a detected or estimated current angle or angular velocity and controls the second controlled object 113. Further, when the second controller 115 directly controls the second controlled object 113, the spatial stabilization apparatus 100 does not include the second driver 116.

The second command generator 117 is the second command generation means described in Claims, which outputs a signal of a target angle of the second angle.

It should be noted that the target angle of the second angle that is output by the second command generator 117 may be retained in advance by the second controller 115. When the target angle of the second angle is retained in advance by the second controller 115, the second controller 115 is input a signal of a detected or estimated current angle or angular velocity according to the preset target angle and outputs a signal that controls the second controlled object 113 to the second driver 116. Further, when the target angle of the second angle is retained in advance by the second controller 115, the spatial stabilization apparatus 100 does not include the second command generator 117.

The first angular velocity detector 118 is the first angular velocity detection means described in Claims, which outputs a signal of controlled object angular velocity as a temporal transition rate of the first angle. It should be noted that the first angular velocity detector 118 may be input a signal of the first angle that is output by the first angle detector 104, time-differentiate the signal of the first angle, and output the result. Alternatively, the first angular velocity detector 118 may configure a state estimator inside the first controller 105, where the first angular velocity detector 118 generates a signal of an estimated value of angular velocity from the first angle and a signal that controls the first controlled object 103 that is output from the first controller 105 and outputs the signal of the estimated value of angular velocity.

The first adder 122 is the first addition means described in Claims, which outputs a signal that is made by adding two input signals. It should be noted that, if the pair of input signals respectively include a plurality of components, the first adder 122 outputs a signal by adding the signals for each component. On the contrary, if there is only one input signal for a certain component and the signal cannot be added, the first adder 122 outputs the input signal as is for the component.

The first coordinate transformer 123 is the first coordinate transformation means described in Claims, which is input signals of fluctuation angular velocity in the inertial sensor coordinate system, a first angle, and a second angle. Then, the first coordinate transformer 123 outputs a signal of three components of Euler angles of rotation of fluctuation angular velocity from the inertial sensor coordinate system to the first coordinate system (hereinafter, referred to as "Euler angle components of fluctuation angular velocity in the first coordinate system") in the coordinate system fixed to the first controlled object 103 (hereinafter, referred to as the "first coordinate system" or "coordinate system 1"). It should be noted that the signal component that is fed back to the first controller 105 is a component of the first angle among the output three components.

The second coordinate transformer 124 is the second coordinate transformation means described in Claims, which is input a signal of the Euler angle components of fluctuation angular velocity in the first coordinate system and the second angle. Then, the second coordinate transformer 124 outputs a signal of three components of Euler angles of rotation of fluctuation angular velocity (hereinafter, referred to as "Euler angle components of fluctuation angular velocity in the second coordinate system") from the first coordinate system to the second coordinate system in the coordinate system fixed to the second controlled object 113 (hereinafter, referred to as the "second coordinate system" or "coordinate system 2"). It should be noted that the signal component that is fed back to the second controller 115 is a component of the second angle among the output three components.

The first trajectory generator 125 is the first trajectory generation means described in Claims, which is input a signal of a target angle and outputs a signal of an angle trajectory and an angular velocity trajectory to reach the target angle. It should be noted that a "trajectory" is transition processes in relation to time.

The first subtractor 126 is the first subtraction means described in Claims, which outputs a signal obtained by subtracting one of two input signals from the other.

Figure 2:
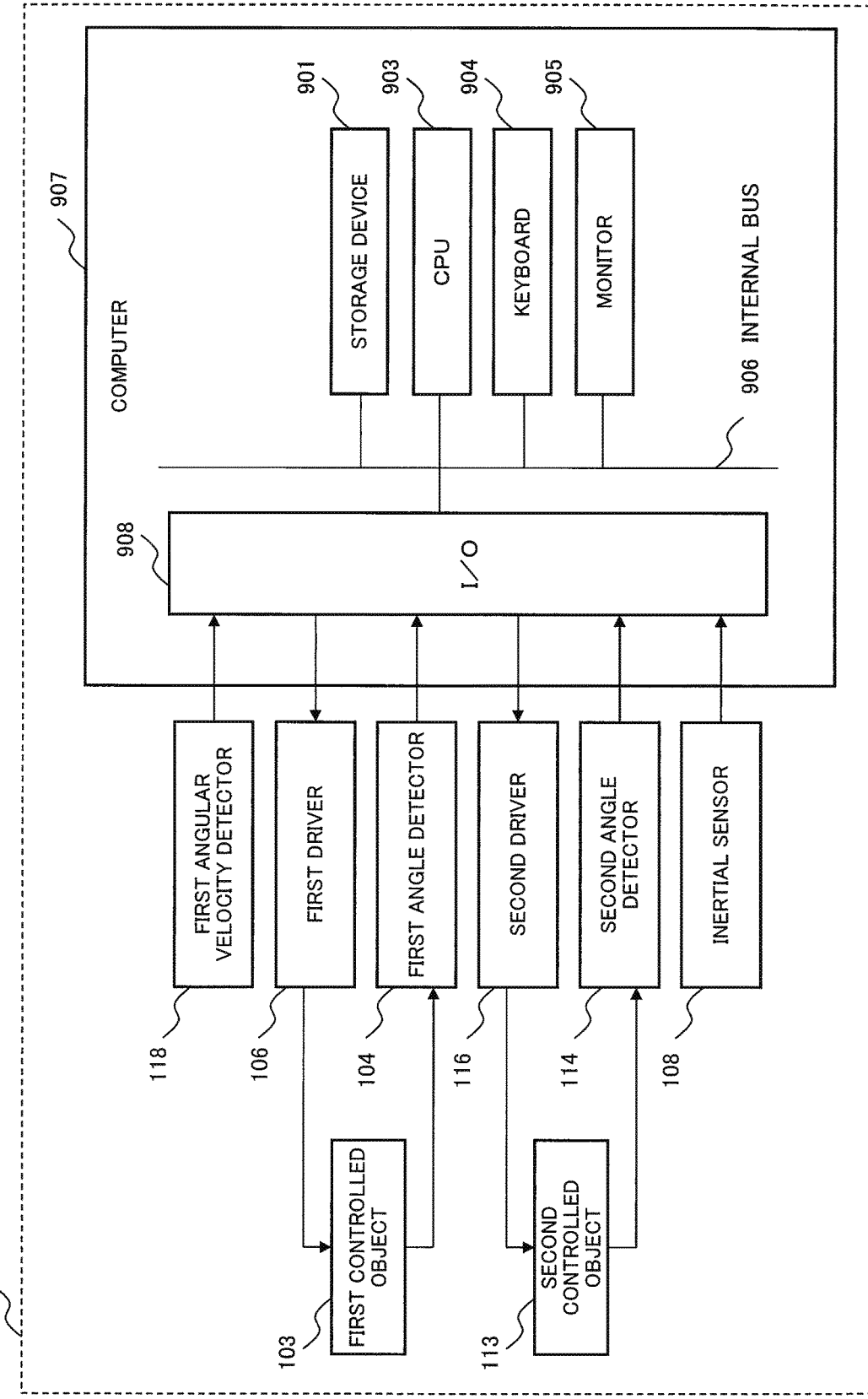
FIG. 2 is a block diagram showing an example of a hardware configuration of the spatial stabilization apparatus of the first exemplary embodiment of the present invention.

FIG. 2 is a block diagram showing an example of a hardware configuration of the spatial stabilization apparatus 100.

The computer 907 of the spatial stabilization apparatus 100 transmits and receives data to and from the first driver 106, the first angle detector 104, the second driver 116, the second angle detector 114, the inertial sensor 108, and the first angular velocity detector 118.

The computer 907 includes a storage device 901, a CPU (Central Processing Unit) 903, a keyboard 904, a monitor 905, and an I/O (Input/Output) 908, which are connected through an inner bus 906.

The I/O 908 is connected to the first driver 106, the first angle detector 104, the second driver 116, the second angle detector 114, the inertial sensor 108, and the first angular velocity detector 118. The I/O 908 mediates transmission and reception of data between the computer 907 and the first driver 106, the first angle detector 104, the second driver 116, the second angle detector 114, the inertial sensor 108, and the first angular velocity detector 118.

The storage device 901 stores an operation program and the like of the first controller 105 and the like of the CPU 903. The CPU 903 controls the computer 907 as a whole, executes the operation program stored in the storage device 901, and performs execution of a program of the first controller 105 and the like and transmission and reception of data through the I/O 908.

It should be noted that the computer 907 may include only the CPU 903 and operate using the storage device 901, the memory 902, the keyboard 904, the monitor 905, and the I/O 908 that are externally provided.

Next, the operation of the first exemplary embodiment will be described.

With regard to the first angle, the first controller 105 is input a signal of a target angle trajectory from the first trajectory generator 125 and is input a current angle signal of the first angle from the first angle detector 104.

Further, the first controller 105 is input a first angle component signal of the Euler angle components of the fluctuation angular velocity in the first coordinate system from the output of the inertial sensor 108.

The first controller 105 generates a signal that controls the first controlled object 103 such that a difference between the target angle trajectory and the current angle becomes 0.

It should be noted that, as negative feedback, the first controller 105 is input the first angle component of the fluctuation angular velocity from the first coordinate transformer 123, subtracts the first angle component from the target angle trajectory, and outputs a control signal such that the fluctuation angle is cancelled. As the result, the angle of the first controlled object 103 is controlled such that the first controlled object 103 is spatially stabilized in relation to the inertial space.

The first coordinate transformer 123 is input a signal of the three components of the angular velocity, in the inertial sensor coordinate system, that is output from the inertial sensor 108. Further, the first coordinate transformer 123 is input a signal of the first angle from the first angle detector 104 and a signal of the second angle from the second angle detector 114. The first coordinate transformer 123 outputs a signal obtained by converting the angular velocity output from the inertial sensor 108 to Euler angle components of the first coordinate system. It should be noted that the output of the first angle component among the output components is fed back to the first controller 105.

The first subtractor 126 subtracts a signal of a target angular velocity trajectory that is output from the first trajectory generator 125 from a signal of the current angular velocity that is output from the first angular velocity detector 118 and outputs a deviation signal of the target angular velocity from the current angular velocity that is a derivative of the first angle.

The first adder 122 adds a signal of the current angular velocity deviation of the first angle that is output from the first subtractor 126 and a signal obtained by converting the fluctuation angular velocity that is output from the first coordinate transformer 123 to Euler angle components in the first coordinate system and outputs a signal of the Euler angle components in the first coordinate system of angular velocity relating to the rotation of the first angle (hereinafter, referred to as the "first residual fluctuation angular velocity").

The second coordinate transformer 124 is input a signal of the Euler angle components in the first coordinate system of the first residual fluctuation angular velocity. Further, the second coordinate transformer 124 is input a signal of the second angle from the second angle detector 114. The second coordinate transformer 124 outputs a signal obtained by converting the first residual fluctuation angular velocity to Euler angle components in the second coordinate system. It should be noted that the output of the second angle components among the output components are fed back to the second controller 115.

With regard to the second angle, the second controller 115 is input a signal of a target angle from the second command generator 117 and is input a current angle signal of the second angle from the second angle detector 114. It should be noted that the target angle is not an angle trajectory.

Further, the second controller 115 is input a second angle component signal of the Euler angle components of the first residual fluctuation angular velocity in the first coordinate system.

The second controller 115 generates a signal that controls the second controlled object 113 such that a difference between the target angle and the current angle becomes 0.

It should be noted that, as negative feedback, the second controller 115 is input the second angle component of the first residual fluctuation angular velocity from the second coordinate transformer 124, subtracts the second angle component from the target angle, and outputs a control signal such that the residual fluctuation angle is cancelled. As the result, the second controlled object 113 is controlled the angle such that the second controlled object 113 is spatially stabilized in relation to the inertial space.

In the following description, coordinate transformation from a coordinate system i to a coordinate system k is expressed by a determinant $^{k}C_i$. The expressions of a roll angle, a pitch angle, a yaw angle, as one of the expressions using Euler angles, of the rotation of the coordinate system k with reference to the coordinate system i are expressed as $\varphi$, $\theta$, $\psi$. In the following example, the rotation axes of the roll angle, pitch angle, and yaw angle are respectively referred to as a roll axis, a pitch axis, and a yaw axis.

An example of coordinate transformation from the coordinate system i to the coordinate system k is expressed by the equation 1.

$$^{k}C_i = C^1(\phi)C^2(\theta)C^3(\psi) = \begin{bmatrix} 1 & 0 & 0 \\ 0 & \cos\phi & \sin\phi \\ - & -\sin\phi & \cos\phi \end{bmatrix}$$
$$\begin{bmatrix} \cos\theta & 0 & -\sin\theta \\ 0 & 1 & 0 \\ \sin\theta & 0 & \cos\theta \end{bmatrix} \begin{bmatrix} \cos\psi & \sin\psi & 0 \\ -\sin\psi & \cos\psi & 0 \\ 0 & 0 & 1 \end{bmatrix}$$ [Equation 1]

Further, the expressions of a roll angle, a pitch angle and a yaw angle of the rotation of the coordinate system 1 in relation to the coordinate system 0 are expressed as ($\varphi_1$, $\theta_1$, $\psi_1$, and the expressions of a roll angle, a pitch angle and a yaw angle of the rotation of the coordinate system 2 in relation to the coordinate system 1 are expressed as ($\varphi_2$, $\theta_2$, $\psi_2$. The coordinate transformation from the coordinate system 0 to the coordinate system 1, and the coordinate transformation from the coordinate system 1 to the coordinate system 2 are respectively expressed by the equation 2 and the equation 3.

$$^{1}C_0 = C^1(\phi_1)C^2(\theta_1)C^3(\psi_1)$$ [Equation 2]

$$^{2}C_1 = C^1(\phi_2)C^2(\theta_2)C^3(\psi_2)$$ [Equation 3]

Further, the direction of the rotation axis of the yaw angle in the rotation of the coordinate system 1 in relation to the coordinate system 0 coincides with the direction of the first rotation axis where the first angle is expressed as $\psi_{11}$. Further, the result of rotating the coordinate system 1 by the first angle $\psi_{11}$ coincides with the coordinate system 2, and the direction of the rotation axis of the yaw angle in the rotation of the coordinate system 2 coincides with the direction of the second rotation axis where the second angle is expressed as $\psi_{22}$. Further, the angular velocity in the inertial sensor coordinate system is expressed as $[\omega_x, \omega_y, \omega_z]^T$. Further, the output of the first coordinate transformer 123 is expressed as $[\omega_{x1}, \omega_{y1}, \omega_{z1}]^T$; the output of the first adder 122 is expressed as $[\omega_{xa1}, \omega_{ya1}, \omega_{za1}]^T$; and the output of the second coordinate transformer 124 is expressed as $[\omega_{x2}, \omega_{y2}, \omega_{z2}]^T$.

The first coordinate transformer 123 converts the input into the output in accordance with formulas 4-5. As the result, angular velocity in the inertial sensor coordinate system is converted to angular velocity in the coordinate system 1. Further, the second coordinate transformer 124 converts the input into the output in accordance with the equation 6. As the result, angular velocity in the coordinate system 1 is converted to angular velocity in the coordinate system 2. It should be noted that the example shows a case in which the direction of an axis (z axis) out of the three axes in the inertial sensor coordinate system coincides with the direction of the first rotation axis.

$$[\omega_{x1}\omega_{y1}\omega_{z1}]^T = C^3(\psi_{11})[\omega_{xx1}\omega_{yy1}\omega_{zz1}]^T \quad \text{[Equation 4]}$$

$$[\omega_{xx1}\omega_{yy1}\omega_{zz1}]^T = C^1(\phi_1)C^2(\theta_1)C^3(\psi_1)[\omega_x\omega_y\omega_z]^T \quad \text{[Equation 5]}$$

$$[\omega_{x2}\omega_{y2}\omega_{z2}]^T = C^3(\psi_{22})[\omega_{xa1}\omega_{ya1}\omega_{za1}]^T \quad \text{[Equation 6]}$$

The first coordinate transformer 123 and the second coordinate transformer 124 may respectively perform coordinate transformation using equations 7 and 8 as relational equations of time derivatives of the Euler angles using 1-2-3 Euler angle sequences instead of the equations 4, 5 and 6. It should be noted that the example shows a case in which the direction of an axis (z axis) out of the three axes in the inertial sensor coordinate system coincides with the direction of the first rotation axis.

$$[\omega_{x1} \ \omega_{y1} \ \omega_{z1}]^T = \begin{bmatrix} \frac{\cos(\psi_1 + \psi_{11})}{\cos\theta_1} & -\frac{\sin(\psi_1 + \psi_{11})}{\cos\theta_1} & 0 \\ \sin(\psi_1 + \psi_{11}) & \cos(\psi_1 + \psi_{11}) & 0 \\ \cos(\psi_1 + \psi_{11}) & \sin(\psi_1 + \psi_{11}) & \\ -\frac{\sin\theta_1}{\cos\theta_1} & \frac{\sin\theta_1}{\cos\theta_1} & 1 \end{bmatrix} [\omega_x \ \omega_y \ \omega_z]^T \quad \text{[Equation 7]}$$

$$[\omega_{x2} \ \omega_{y2} \ \omega_{z2}]^T = \begin{bmatrix} \cos(\psi_{22}) & -\sin(\psi_{22}) & 0 \\ \sin(\psi_{22}) & \cos(\psi_{22}) & 0 \\ 0 & 0 & 1 \end{bmatrix} [\omega_{xa1} \ \omega_{ya1} \ \omega_{za1}]^T \quad \text{[Equation 8]}$$

As described above, the spatial stabilization apparatus 100 of the first exemplary embodiment can realize high spatial stability with a single inertial sensor. The reason is as follows: Both the first controller 105 and the second controller 115 use the output from the inertial sensor 108 to output a signal of a control command such that the first controller 105 cancels the fluctuation angle. As the result, the first controlled object 103 is controlled the angle such that the first controlled object 103 is spatially stabilized in relation to the inertial space. At the same time, the second controller 115 outputs a signal of a control command such that the residual fluctuation angle that could not be removed by the first controlled object 103 is cancelled. As the result, the second controlled object 113 is controlled the angle such that the second controlled object 113 is spatially stabilized in relation to the inertial space.

It should be noted that, if the direction of one axis out of the three axes in the inertial sensor coordinate system (z axis in the first exemplary embodiment, without limitation to the z axis) coincides with the direction of the first rotation axis and the direction of the second rotation axis where $\varphi_1 = \theta_1 = \psi_1 = 0$, the spatial stabilization apparatus 100 operates using only the output of one component by replacing the components of the rest of two axes out of the three axes in the inertial sensor coordinate system with 0.

In the first exemplary embodiment, the angle trajectory that is output from the first trajectory generator 125 is the target angle. Then, in the first exemplary embodiment, the first controller 105 performs an angle control by being input the first angle that is the output from the first angle detector 104 as the current angle and generating a control signal that controls the first angle of the first controlled object 103. Likewise, in the first exemplary embodiment, the output from the second command generator 117 is the target angle. Then, the second controller 115 performs an angle control by being input the second angle that is the output from the second angle detector 114 as the current angle and generating a control signal that controls the second angle of the second controlled object 113.

However, the first exemplary embodiment is not limited to the angle control, and the angular velocity that is output by the first trajectory generator 125 may be target angular velocity. Then, the first controller 105 may perform an angular velocity control by being input angular velocity obtained by differentiating the first angle that is the output from the first angle detector 104 as the current angular velocity and generating a control signal that controls the first angular velocity of the first controlled object 103. Likewise, the output from the second command generator 117 may be target angular velocity. Then, the second controller 115 may perform an angular velocity control by being input angular velocity obtained by differentiating the second angle that is the output from the second angle detector 114 as the current angular velocity and generating a control signal that controls the second angular velocity of the second controlled object 113.

Figure 3:
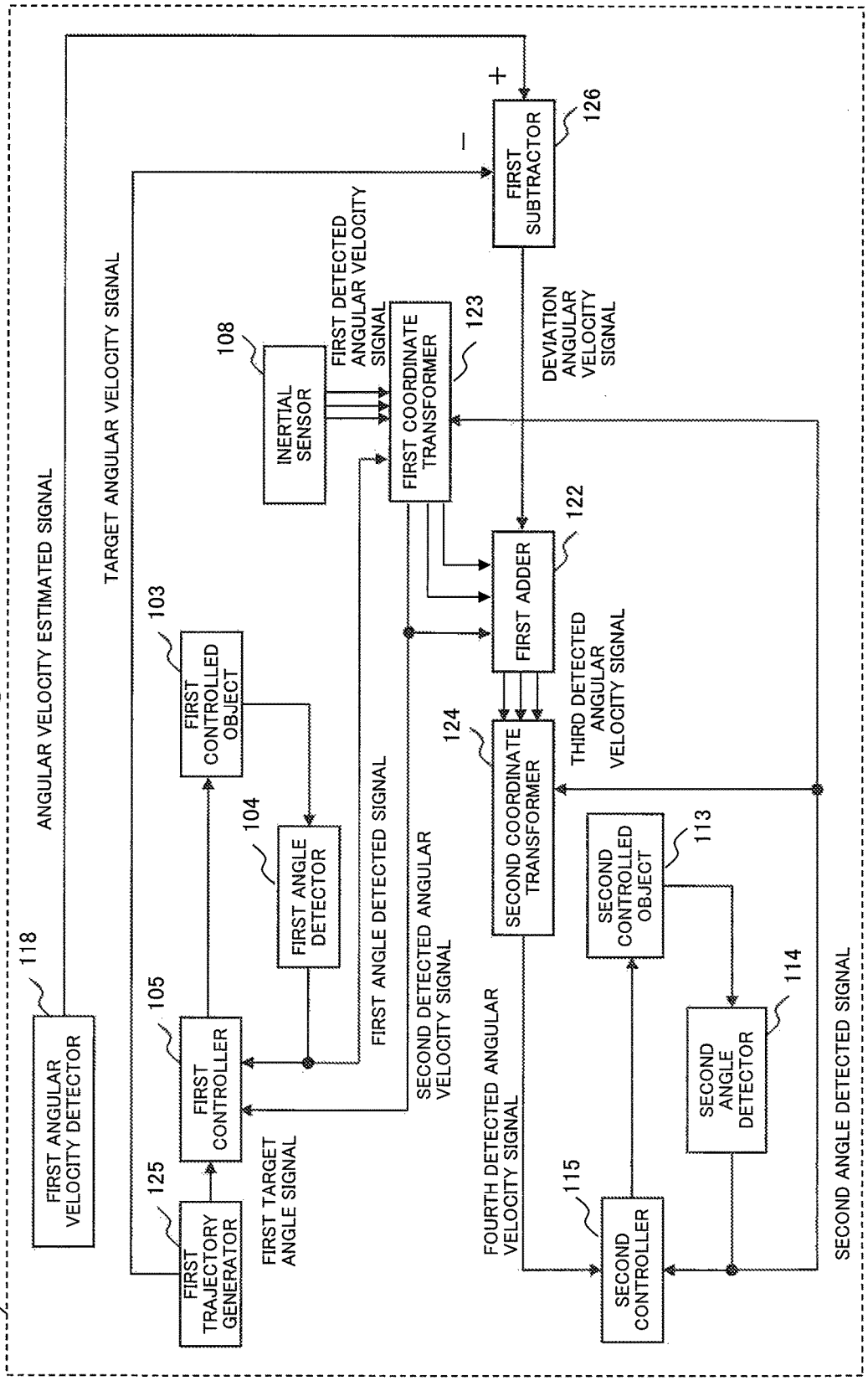
FIG. 3 is a block diagram showing a configuration of a reduced spatial stabilization apparatus of the first exemplary embodiment of the present invention.

FIG. 3 shows a spatial stabilization apparatus that has a reduced configuration as another example of the present invention.

As described above, the target angle of the first angle that is output by the first command generator 107 may be retained in advance by the first trajectory generator 125. When the target angle of the first angle is retained in advance by the first trajectory generator 125, the first trajectory generator 125 outputs a signal of an angle trajectory and an angular velocity trajectory to reach the target angle in accordance with the preset target angle. Further, when the target angle of the first angle is retained in advance by the first trajectory generator 125, the spatial stabilization apparatus does not include the first command generator 107.

It should be noted that the target angle of the second angle that is output from the second command generator 117 may be retained in advance by the second controller 115. If the target angle of the second angle is retained in advance by the second controller 115, the second controller 115 is input a signal of a detected or estimated current angle or angular velocity in accordance with the preset target angle and outputs a signal that controls the second controlled object 113 to the second driver 116. Further, when the target angle of the second angle is retained in advance by the second controller 115, the spatial stabilization apparatus does not include the second command generator 117.

It should be noted that the first controller 105 may directly control the first controlled object 103. When the first controller 105 directly controls the first controlled object 103, the first controller 105 is input a signal of a target angle and a detected or estimated current angle or angular velocity and controls the first controlled object 103. Further, when the first controller 105 directly controls the first controlled object 103, the spatial stabilization apparatus does not include the first driver 106.

It should be noted that the second controller 115 may directly control the second controlled object 113. When the second controller 115 directly controls the second controlled object 113, the second controller 115 is input a signal of a target angle and a detected or estimated current angle or angular velocity and controls the second controlled object 113. Further, when the second controller 115 directly controls the second controlled object 113, the spatial stabilization apparatus does not include the second driver 116.

Further, the spatial stabilization apparatus of FIG. 3 may be added a first command generator 107, a second command generator 117, a first driver 106, or a second driver 116.

Figure 8:
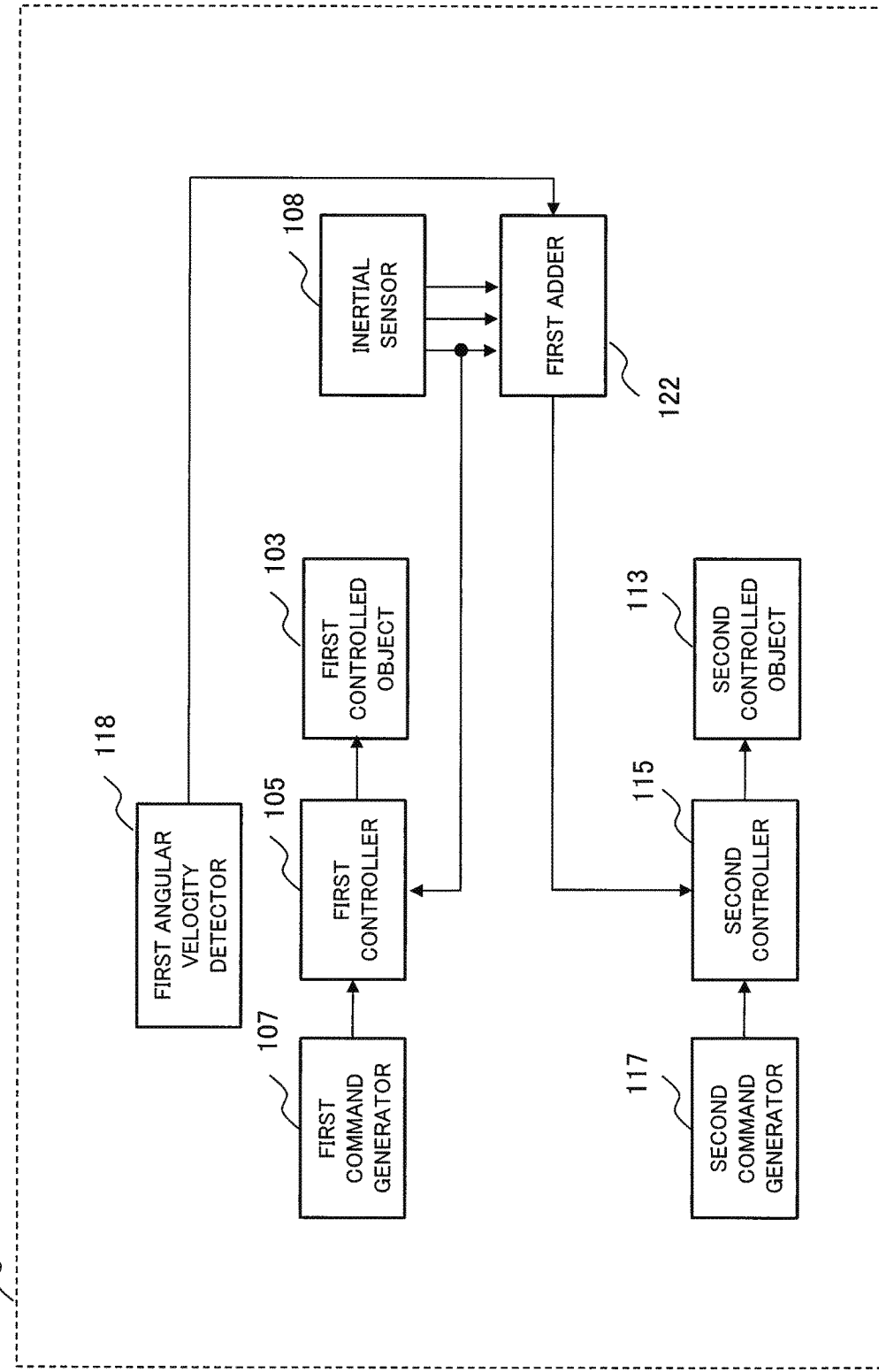
FIG. 8 is a block diagram showing a minimum configuration of the spatial stabilization apparatus of the first exemplary embodiment of the present invention.

FIG. 8 shows a spatial stabilization apparatus that has a minimum configuration as another example of the present invention.

If the output signal of the first controller 105 can be deemed as the detected signal of the first angle, the first driver 106 and the first angle detector 104 can be omitted.

If the output signal of the second controller 115 can be deemed as the detected signal of the second angle, the second driver 116 and the second angle detector 114 can be omitted.

If the first angle is controlled without controlling any angle trajectory or angular velocity trajectory to reach the target angle of the first angle, the first trajectory generator 125 and the first subtractor can be omitted.

If the inertial sensor coordinate system coincides with the first coordinate system that is fixed to the first controlled object 103, the first coordinate transformer 123 can be omitted. If the inertial sensor 108 is fixed to the first controlled object 103, the first coordinate transformer 123 can be omitted.

If the first coordinate system that is fixed to the first controlled object 103 coincides with the second coordinate system that is fixed to the second controlled object 113, the second coordinate transformer 124 can be omitted. That is, if the first rotation axis, around which the first controlled object 103 is rotatably connected to the fixed part, coincides with the second rotation axis, around which the second controlled object 113 is rotatably connected to the first controlled object 103, the second coordinate transformer 124 can be omitted.

That is, the spatial stabilization apparatus 100 that has the minimum configuration of the present invention includes a first controlled object 103, a second controlled object 113, an inertial sensor 108, a first angular velocity detector 118, a first command generator 107, a second command generator 117, a first adder 122, a first controller 105, and a second controller 115.

The first controlled object 103 is connected to the moving body in a manner rotatable around the first rotation axis.

The second controlled object 113 is connected to the first controlled object 103 in a manner rotatable around the second rotation axis.

The inertial sensor 108 is the inertial detection means described in Claims, which measures angular velocity of either the moving body or the first controlled object 103 and outputs a first detected angular velocity signal that includes one or more components out of the three components in the orthogonal coordinate system that is fixed to either the moving body or the first controlled object 103.

The first angular velocity detector 118 is the first angular velocity detection means described in Claims, which outputs an angular velocity estimated signal that is estimated or detected angular velocity with respect to the first angle of the first controlled object 103 in relation to the moving body.

The first command generator 107 is the first command generation means described in Claims, which outputs a target angle signal of the first angle.

The second command generator 117 is the second command generation means described in Claims, which outputs a target angle signal of the second angle of the second controlled object 113 with reference to the first controlled object 103.

The first adder 122 is the first addition means described in Claims, which adds a signal based on the angular velocity estimated signal and a signal based on the first detected angular velocity signal and outputs a second detected angular velocity signal.

The first controller 105 is the first control means described in Claims, which controls the first angle based on a signal based on the target angle signal of the first angle and a signal based on the first detected angular velocity signal.

The second controller 115 is the second control means described in Claims, which controls the second angle based on a signal based on the target angle signal of the second angle and a signal based on the second detected angular velocity signal.

Second Exemplary Embodiment

The configuration of the spatial stabilization apparatus in the second exemplary embodiment of the present invention is the same as the configuration of the spatial stabilization apparatus 100 in the first exemplary embodiment shown in FIG. 1. The description of the second exemplary embodiment that is common with the first exemplary embodiment will be omitted, thus, only differences of the second exemplary embodiment with reference to the first exemplary embodiment will be described.

While the inertial sensor 108 is fixed to the fixed part in the first exemplary embodiment of the present invention, the inertial sensor 108 is fixed to the first controlled object 103 in the second exemplary embodiment. As such, the first controller 105 is input a signal of a first angle component of the angular velocity obtained by converting fluctuation angular velocity that is output from the inertial sensor 108 to Euler angle components in the first coordinate system by the first coordinate transformer 123.

The first coordinate transformer 123 transforms the input into the output in accordance with the equation 9. As the result, angular velocity in the inertial sensor coordinate system is converted to angular velocity in the coordinate system 1.

$$[\omega_{x1}\,\omega_{y1}\,\omega_{z1}]^T = [\omega_x\,\omega_y\,\omega_z]^T \qquad \text{[Equation 9]}$$

The first coordinate transformer 123 may perform coordinate transformation using the following equation 10 as a relational equation of a time derivative of Euler angles using 1-2-3 Euler angle sequences instead of the equation 9, while the equation 10 and equation 9 are the same.

$$[\omega_{x1}\,\omega_{y1}\,\omega_{z1}]^T = [\omega_x\,\omega_y\,\omega_z]^T \qquad \text{[Equation 10]}$$

It should be noted that, if one axis out of three axes in the inertial sensor coordinate system (z axis in the second exemplary embodiment, without limitation to the z axis) coincides with the direction of the first rotation axis and the direction of the second rotation axis, the spatial stabilization apparatus operates using only the output of one component by replacing the components of the rest of two axes out of the three axes in the inertial sensor coordinate system with 0.

As described above, the spatial stabilization apparatus of the second exemplary embodiment can realize high spatial stability with a single inertial sensor. The reason is as follows: Both the first controller 105 and the second controller 115 use the output from the inertial sensor 108 to output a signal of a control command such that the first controller 105 cancels the fluctuation angle. As the result, the first controlled object 103 is controlled the angle such that the first controlled object 103 is spatially stabilized in relation to the inertial space. At the same time, the second controller 115 outputs a signal of a control command such that the residual fluctuation angle that could not be removed by the first controlled object 103 is cancelled. As the result, the second controlled object 113 is controlled the angle such that the second controlled object 113 is spatially stabilized in relation to the inertial space.

Third Exemplary Embodiment

The configuration of the spatial stabilization apparatus in the third exemplary embodiment of the present invention is the same as the configuration of the spatial stabilization apparatus in the first exemplary embodiment shown in FIG. 1. The description of the third exemplary embodiment that is common with the first exemplary embodiment will be omitted, thus, only differences of the third exemplary embodiment with reference to the first exemplary embodiment will be described.

While, the inertial sensor 108 is fixed to the fixed part in the first exemplary embodiment of the present invention, the inertial sensor 108 is fixed to the second controlled object 113 in the third exemplary embodiment. As such, the first controller 105 is input a signal of angular velocity obtained by converting fluctuation angular velocity in the inertial sensor coordinate system to Euler angle components in the first coordinate system by the first coordinate transformer 123.

The first coordinate transformer 123 transforms the input into the output in accordance with the equation 11. As the result, angular velocity in the inertial sensor coordinate system is converted to angular velocity in the coordinate system 1.

As described above, the spatial stabilization apparatus of the third exemplary embodiment can realize high spatial stability with a single inertial sensor. The reason is as follows: Both the first controller 105 and the second controller 115 use the output from the inertial sensor 108 to output a signal of a control command such that the first controller 105 cancels the fluctuation angle. As the result, the first controlled object 103 is controlled the angle such that the first controlled object 103 is spatially stabilized in relation to the inertial space. At the same time, the second controller 115 outputs a signal of a control command such that the residual fluctuation angle that could not be removed by the first controlled object 103 is cancelled. As the result, the second controlled object 113 is controlled the angle such that the second controlled object 113 is spatially stabilized in relation to the inertial space.

$$[\omega_{x1}\omega_{y1}\omega_{z1}]^T = \{C^3(\psi_{22})\}^{-1}[\omega_x\omega_y\omega_z]^T \quad \text{[Equation 11]}$$

The first coordinate transformer 123 may perform a coordinate transformation using the following equation 12 as a relational equation of a time derivative of Euler angles using 1-2-3 Euler angle sequences instead of the equation 11.

$$[\omega_{x1}\ \omega_{y1}\ \omega_{z1}]^T = \begin{bmatrix} \cos(-\psi_{22}) & -\sin(-\psi_{22}) & 0 \\ \sin(-\psi_{22}) & \cos(-\psi_{22}) & 0 \\ 0 & 0 & 1 \end{bmatrix}[\omega_x\ \omega_y\ \omega_z]^T \quad \text{[Equation 12]}$$

It should be noted that, if the direction of one axis out of the three axes in the inertial sensor coordinate system (the z axis in the third exemplary embodiment, without limitation to the z axis) coincides with the direction of the first rotation axis and the direction of the second rotation axis where $\varphi_2 = \theta_2 = \psi_{2=0}$, the spatial stabilization apparatus operates using only the output of one component by replacing the components of the rest of two axes out of the three axes in the inertial sensor coordinate system with 0.

Fourth Exemplary Embodiment

Figure 4:
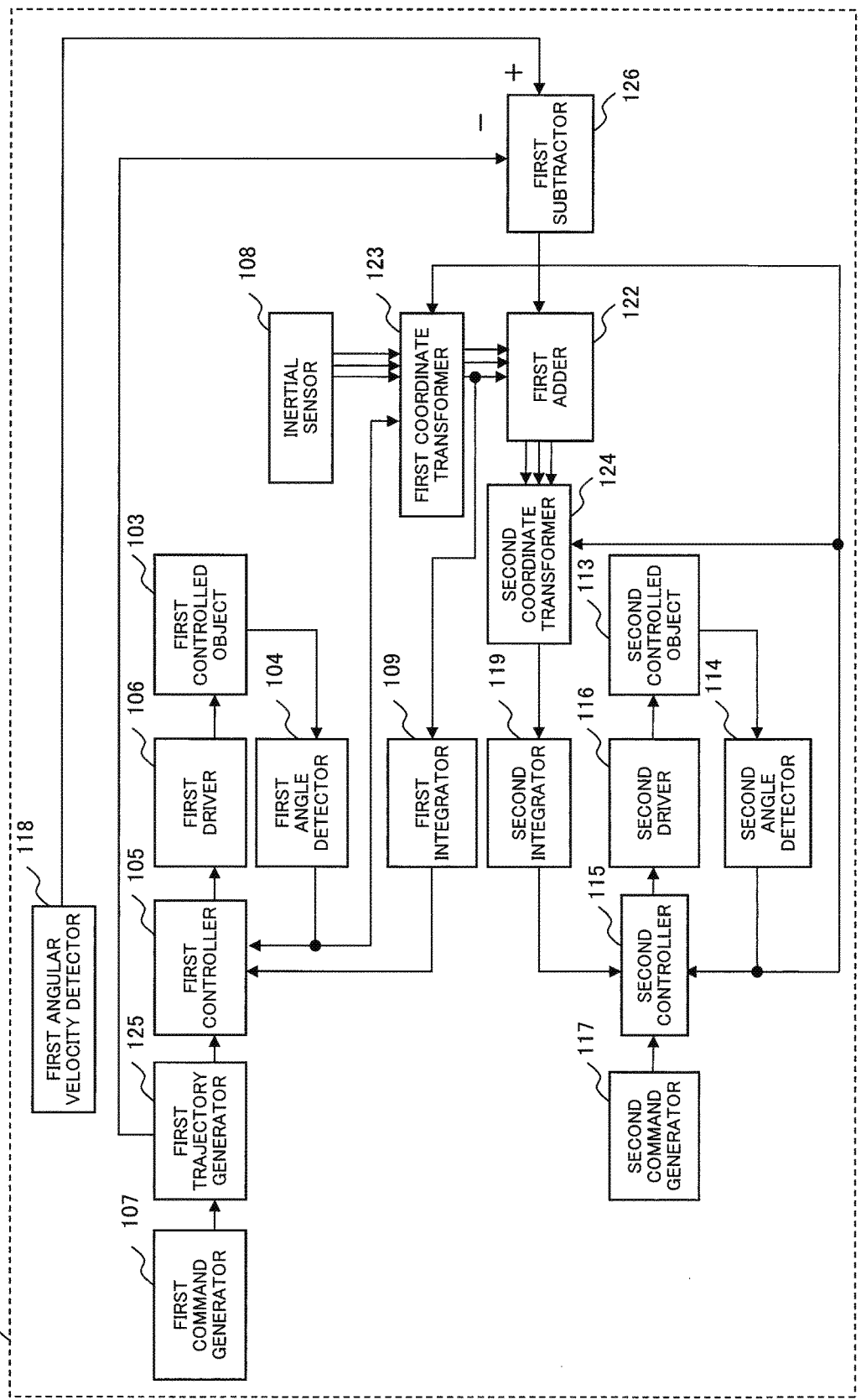
FIG. 4 is a block diagram showing a configuration of a spatial stabilization apparatus of a fourth exemplary embodiment of the present invention.

FIG. 4 is a block diagram showing a configuration of a spatial stabilization apparatus of a fourth exemplary embodiment of the present invention. The description of the fourth exemplary embodiment that is common with the first exemplary embodiment of the present invention will be omitted, thus, only differences of the fourth exemplary embodiment with reference to the first exemplary embodiment of the present invention will be described.

The spatial stabilization apparatus 100 of the fourth exemplary embodiment further includes a first integrator 109 and a second integrator 119 in addition to the configuration of the first exemplary embodiment shown in FIG. 1.

The first integrator 109 outputs a signal obtained by time-integrating the input signal. Specifically, the Euler angle components of the fluctuation angular velocity, as will be described below, are integrated and converted to a first angle component signal of the fluctuation angle.

The second integrator 119 outputs a signal obtained by time-integrating the input signal.

The first controller 105 is input a first angle component signal of a fluctuation angle that is converted as an angle by the first integrator 109 from the Euler angle components of the fluctuation angular velocity in the first coordinate system in the output from the inertial sensor 108.

It should be noted that, as negative feedback, the first controller 105 is input the first angle component of the fluctuation angle from the first integrator 109, subtracts the first angle component from the target angle trajectory, and outputs a control signal such that the fluctuation angle is cancelled. As the result, the first controlled object 103 is controlled the angle such that the first controlled object 103 is spatially stabilized in relation to the inertial space.

Further, the second controller 115 is input a second angle component signal of a residual fluctuation angle that is converted as an angle by the second integrator 119 from the Euler angle components of the first residual fluctuation angular velocity in the first coordinate system.

It should be noted that, as negative feedback, the second controller 115 is input the second angle component of the residual fluctuation angle from the second integrator 119, subtracts the second angle component from the target angle, and outputs a control signal such that the residual fluctuation angle is cancelled. As the result, the second controlled object 113 is controlled the angle such that the second controlled object 113 is spatially stabilized in relation to the inertial space.

As described above, the spatial stabilization apparatus of the fourth exemplary embodiment can realize high spatial stability with a single inertial sensor. The reason is as follows: Both the first controller 105 and the second controller 115 use the output that is converted as an angle by the first integrator 109 and the second integrator 119 from the output of the inertial sensor 108 to output a signal of a control command such that the first controller 105 cancels the fluctuation angle. As the result, the first controlled object 103 is controlled the angle such that the first controlled object 103 is spatially stabilized in relation to the inertial space. At the same time, the second controller 115 outputs a signal of a control command from the second controller 115 such that the residual fluctuation angle that could not be removed by the first controlled object 103 is cancelled. As the result, the second controlled object 113 is controlled the angle such that the second controlled object 113 is spatially stabilized in relation to the inertial space.

It should be noted that the differences from the first exemplary embodiment were described in the fourth exemplary embodiment. However, the inertial sensor 108 of the fourth exemplary embodiment is not limited to be fixed to the fixed part, in the same way as the first exemplary embodiment. As long as the inertial sensor 108 outputs angular velocity, the first integrator 109 or the second integrator 119 can output an angle by time-integrating the angular velocity. Therefore, the inertial sensor 108 of the fourth exemplary embodiment may be fixed to the first controlled object 103 in the same way as the second exemplary embodiment or fixed to the second controlled object 113 in the same way as the third exemplary embodiment.

Fifth Exemplary Embodiment

Figure 5:
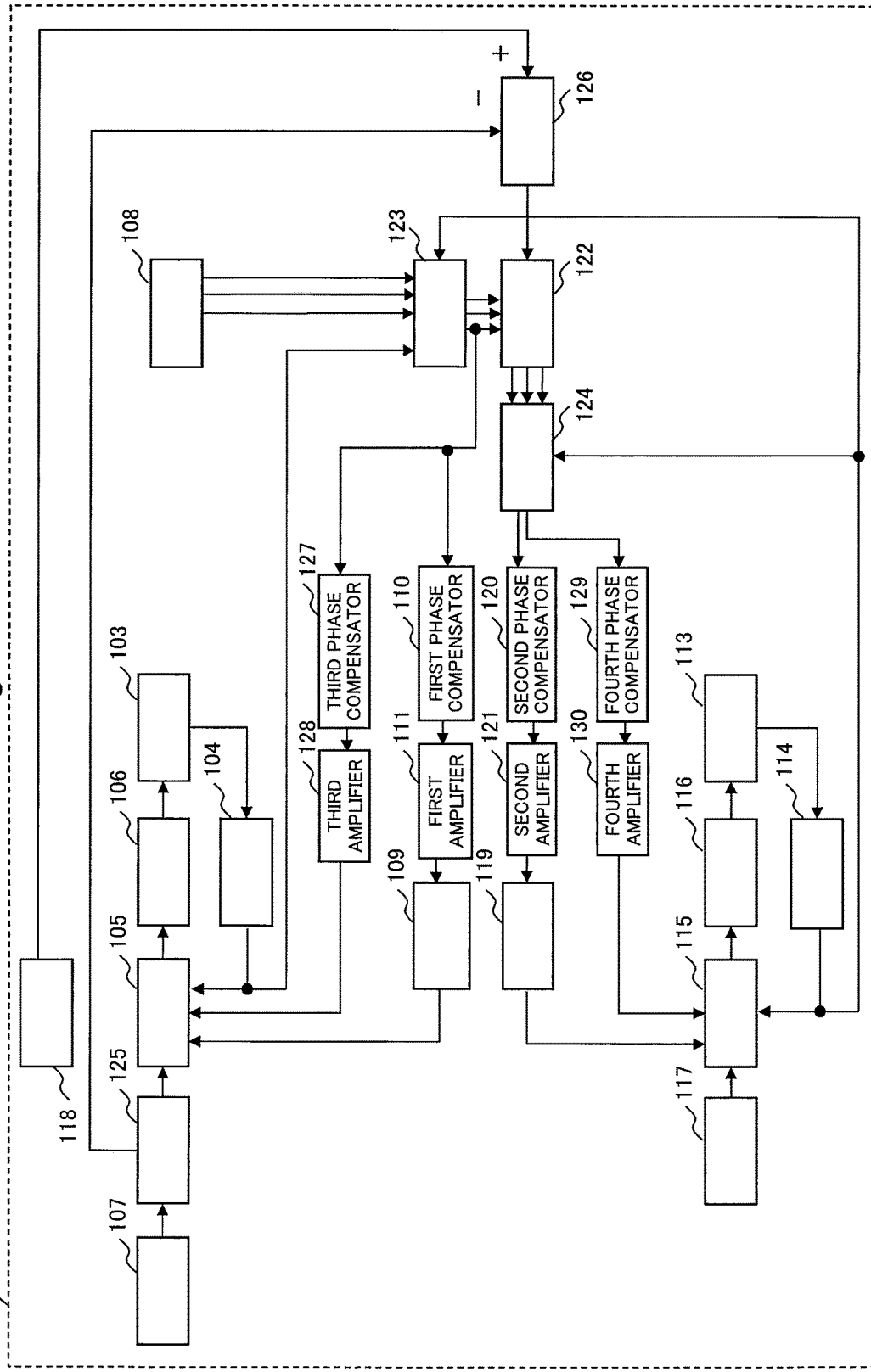
FIG. 5 is a block diagram showing a configuration of a spatial stabilization apparatus of a fifth exemplary embodiment of the present invention.

FIG. 5 is a block diagram showing a configuration of a spatial stabilization apparatus of a fifth exemplary embodiment of the present invention. The description of the fifth exemplary embodiment that is common with the fourth exemplary embodiment of the present invention will be omitted, thus, only differences of the fifth exemplary embodiment with reference to the fourth exemplary embodiment of the present invention will be described.

Compared with the configuration of the fourth exemplary embodiment shown in FIG. 4, the spatial stabilization apparatus 100 of the fifth exemplary embodiment further includes a first phase compensator 110, a second phase compensator 120, a third phase compensator 127, a fourth phase compensator 129, a first amplifier 111, a second amplifier 121, a third amplifier 128, a fourth amplifier 130, a first angle detector 104, a first controller 105, a first driver 106, and a first command generator 107.

The first phase compensator 110, the second phase compensator 120, the third phase compensator 127, and the fourth phase compensator 129 do filter processing that is indicated by, for example, a transfer function indicated by the equation 13 to the respective input signals ($f_1$ and $f_2$ in the equation 13 indicate frequencies that can be set arbitrarily by a user) and output signals obtained by changing phases of the respective input signals in accordance with preset frequency values.

$$\frac{s + 2\pi f_1}{s + 2\pi f_2} \quad \text{[Equation 13]}$$

When input and output signals of a certain transformer are functions x(t) and y(t) where time t≥0, if the Laplace transforms thereof are X(s) and Y(s), Y(s)/X(s) is a transfer function. The Laplace transform of a function f(t) where time t≥0 is defined by the equation 14 as a function of a complex number s.

$$F(s) = \int_0^\infty f(t) e^{-st} dt \quad \text{[Equation 14]}$$

The first amplifier 111, the second amplifier 121, the third amplifier 128, and the fourth amplifier 130 output signals obtained by changing the gains of the respective input signals in accordance with the respective preset values.

In between the output of the first coordinate transformer 123 and the first integrator 109 or first controller 105, the first phase compensator 110 and the first amplifier 111 are inserted. As such, a phase of the Euler angle components of the fluctuation angular velocity in the first coordinate system in the output from the inertial sensor 108 or a phase of a first angle component signal of the fluctuation angle of the angle that was converted from the fluctuation angular velocity by the first integrator 109 (delay from the output of the inertial sensor 108 to the first angle) and a gain thereof (a ratio between the amplitude of the first angle component of the fluctuation angle and the first angle amplitude) can be adjusted. By changing the phase characteristic retained by the first phase compensator 110 and the value of the gain retained by the first amplifier 111, the first controller 105 can receive a signal of an optimal gain characteristic (gain=1) without delay, improving responsiveness for spatial stability.

In between the output of the second coordinate transformer 124 and the second integrator 119 and second controller 115, the second phase compensator 120 and the second amplifier 121 are inserted. As such, a phase of the Euler angle components of the first residual fluctuation angular velocity in the first coordinate system or a phase of a second angle component signal of the residual fluctuation angle (delay from the output of the inertial sensor 108 to the second angle) and a gain thereof (a ratio between the amplitude of the second angle component of the fluctuation angle and the second angle amplitude) can be adjusted. By changing the phase characteristic retained by the second phase compensator 120 and the value of the gain retained by the second amplifier 121, the second controller 115 can receive a signal of an optimal gain characteristic (gain=1) without delay, improving responsiveness for spatial stability.

In between the output of the first coordinate transformer 123 and the first controller 105, the third phase compensator 127 and the third amplifier 128 are inserted. As such, a phase (delay) of an Euler angle component signal of the fluctuation angular velocity in the first coordinate system in the output of the inertial sensor 108 and a gain thereof can be adjusted. The first controller 105 performs a control (proportional control) by aiming to achieve the first angle component signal of the fluctuation angle and using feedback of the detected angle signal. The first controller 105 further performs a control (derivative control) by aiming to achieve an Euler angle component signal of the fluctuation angular velocity in the first coordinate system and using feedback of a detected angular velocity signal as a time derivative of the detected angle. As such, the first controller 105 can improve responsiveness for spatial stability. By changing the phase characteristic retained by the third phase compensator 127 and the value of the gain retained by the third amplifier 128, the first controller 105 can receive a signal of an optimal phase and gain characteristic.

In between the output of the second coordinate transformer 124 and the second controller 115, the fourth phase compensator 129 and the fourth amplifier 130 are inserted. As such, a phase (delay) of an Euler angle component signal of the first residual fluctuation angular velocity in the first coordinate system in relation to the second controller 115 and a gain thereof can be adjusted. The second controller 115 performs a control (proportional control) by aiming to achieve the second angle component signal of the residual fluctuation angle and using feedback of the detected angle signal. The second controller 115 further performs a control (derivative control) by aiming to achieve an Euler angle component signal of the first residual fluctuation angular velocity in the first coordinate system and using feedback of a detected angular velocity signal. As such, the second controller 115 can improve responsiveness for spatial stability. By changing the value of a phase difference retained by the fourth phase compensator 129 and the value of a gain retained by the fourth amplifier 130, the second controller 115 can receive a signal of an optimal phase and gain characteristic.

As described above, the spatial stabilization apparatus of the fifth exemplary embodiment can improve responsiveness for spatial stability in addition to the effect of the first exemplary embodiment. The first reason is that both the first controller 105 and the second controller 115 can receive a fluctuation angle and a residual fluctuation angle signal of an optimal gain without delay using the first phase compensator 110 and the first amplifier 111 or the second phase compensator 120 and the second amplifier 121. The second reason is that both the first controller 105 and the second controller 115 can receive fluctuation angular velocity and a first residual fluctuation angular velocity signal of an optimal gain without delay using the third phase compensator 127 and the third amplifier 128 or the fourth phase compensator 129 and the fourth amplifier 130.

It should be noted that the spatial stabilization apparatus in the fifth exemplary embodiment may have a configuration without the third phase compensator 127 and the third amplifier 128, and the fourth phase compensator 129 and the fourth amplifier 130. In such a case, both the first controller 105 and the second controller 115 can receive a fluctuation angle and a residual fluctuation angle signal of an optimal gain without delay. Further, the spatial stabilization apparatus in the fifth exemplary embodiment may have a configuration without the first phase compensator 110 and the first amplifier 111, and the second phase compensator 120 and the second amplifier 121. In such a case, both the first controller 105 and the second controller 115 can receive fluctuation angular velocity and a first residual fluctuation angular velocity signal of an optimal gain without delay.

Sixth Exemplary Embodiment

Figure 6:
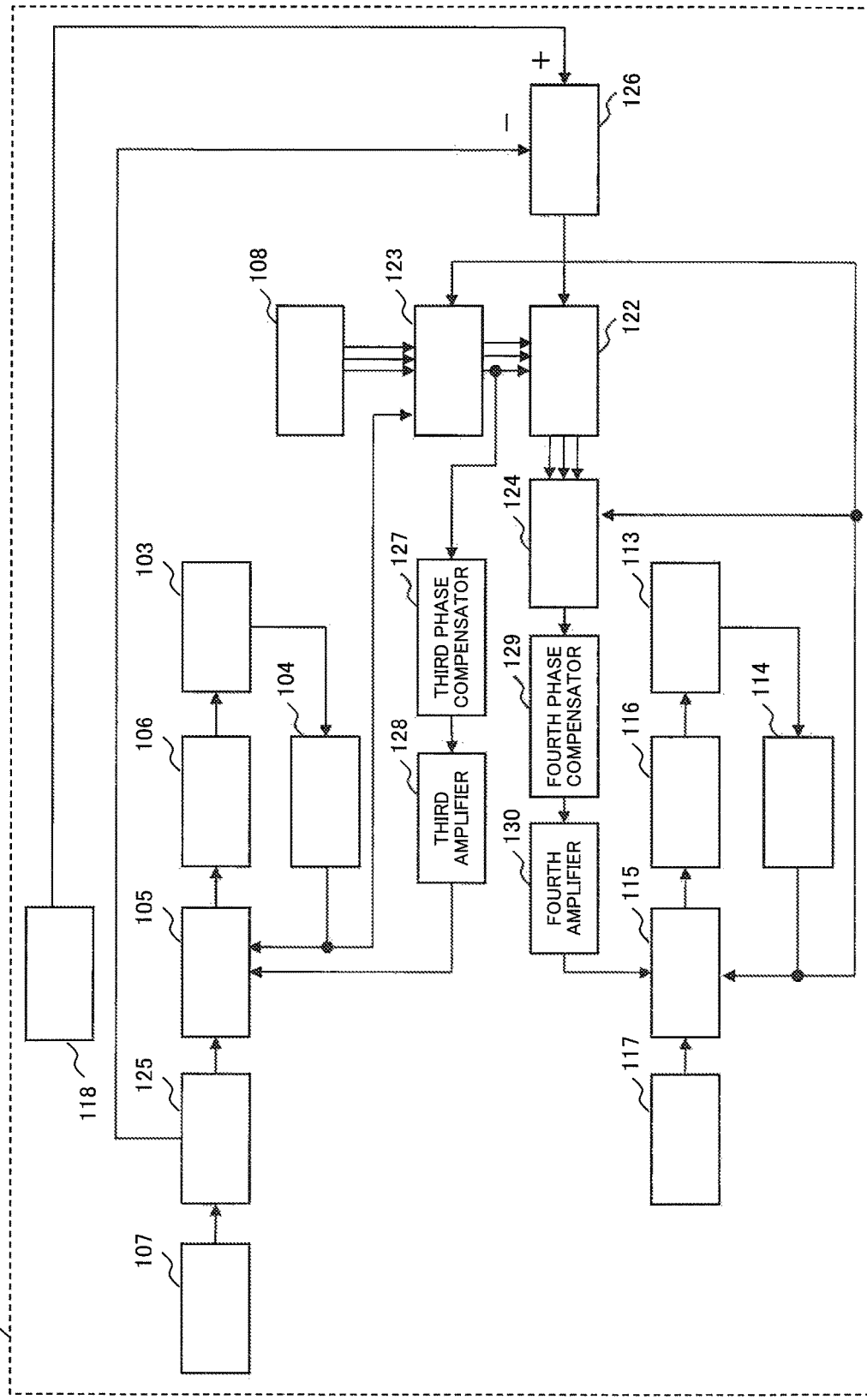
FIG. 6 is a block diagram showing a configuration of a spatial stabilization apparatus of a sixth exemplary embodiment of the present invention.

FIG. 6 is a block diagram showing a configuration of a spatial stabilization apparatus of a sixth exemplary embodiment of the present invention. The description of the sixth exemplary embodiment that is common with the first exemplary embodiment of the present invention and the fifth exemplary embodiment of the present invention will be omitted, thus, only differences of the sixth exemplary embodiment will be described.

Compared with the configuration of the first exemplary embodiment shown in FIG. 1, the spatial stabilization apparatus 100 of the sixth exemplary embodiment further includes a third amplifier 128, a third phase compensator 127, a fourth amplifier 130, and a fourth phase compensator 129 of the fifth exemplary embodiment shown in FIG. 5.

The third amplifier 128, the third phase compensator 127, the fourth amplifier 130, and the fourth phase compensator 129 are equivalent to the third amplifier 128, the third phase compensator 127, the fourth amplifier 130, and the fourth phase compensator 129 of the fifth exemplary embodiment shown in FIG. 5.

In between the output of the first coordinate transformer 123 and the first controller 105, the third phase compensator 127 and the third amplifier 128 are inserted. As such, a phase (delay) of an Euler angle component signal of the fluctuation angular velocity in the first coordinate system of the output of the inertial sensor 108 and a gain thereof can be adjusted.

As the first controller 105 performs a control (derivative control) by aiming to achieve an Euler angle component signal of the fluctuation angular velocity in the first coordinate system and using feedback of a detected angular velocity signal as a time derivative of a detected angle, responsiveness for spatial stability can be improved.

By changing a phase characteristic retained by the third phase compensator 127 and the value of a gain retained by the third amplifier 128, the first controller 105 can receive a signal of an optimal phase and gain characteristic.

In between the output of the second coordinate transformer 124 and the second controller 115, the fourth phase compensator 129 and the fourth amplifier 130 are inserted. As such, a phase (delay) of an Euler angle component signal of the first residual fluctuation angular velocity in the first coordinate system in relation to the second controller 115 and a gain thereof can be adjusted.

As the second controller 115 performs a control (derivative control) by aiming to achieve an Euler angle component signal of the first residual fluctuation angular velocity in the first coordinate system and using feedback of a detected angular velocity signal, responsiveness for spatial stability can be improved.

By changing the value of a phase difference retained by the fourth phase compensator 129 and the value of a gain retained by the fourth amplifier 130, the second controller 115 can receive a signal of an optimal phase and gain characteristic.

As described above, the spatial stabilization apparatus of the sixth exemplary embodiment can improve responsiveness for spatial stability in addition to the effect of the first exemplary embodiment. This is because both the first controller 105 and the second controller 115 can receive fluctuation angular velocity and a first residual fluctuation angular velocity signal of an optimal gain without delay using the third phase compensator 127 and the third amplifier 128 or the fourth phase compensator 129 and the fourth amplifier 130.

It should be noted that the spatial stabilization apparatus 100 in the sixth exemplary embodiment may have a configuration without the third phase compensator 127 and the third amplifier 128, or the fourth phase compensator 129 and the fourth amplifier 130.

In the sixth exemplary embodiment, the differences from the first exemplary embodiment have been described. However, the inertial sensor 108 of the sixth exemplary embodiment is not limited to be fixed to the fixed part, in the same way as the first exemplary embodiment. As long as the inertial sensor 108 outputs a signal of angular velocity or an angle, the third phase compensator 127, the fourth phase compensator 129, the third amplifier 128, or the fourth amplifier 130 can adjust a phase (delay) and a gain of the signal. Therefore, the inertial sensor 108 of the sixth exemplary embodiment may be fixed to the first controlled object 103 in the same way as the second exemplary embodiment or fixed to the second controlled object 113 in the same way as the third exemplary embodiment.

Further, in the same way as the first exemplary embodiment, the spatial stabilization apparatus 100 is not limited to the configuration without the first integrator 109, the second integrator 119, the first amplifier 111, the second amplifier 121, the first phase compensator 110 and the second phase compensator 120. The signal path, through which a feedback signal is output to the first controller 105 or the second controller 115, can adjust the phase (delay) and the gain of the signal as long as the signal path outputs angular velocity or angle. Alternatively, the signal path, through which a feedback signal is output to the first controller 105 or the second controller 115, can convert a signal of angular velocity to a signal of an angle using the first integrator 109 or the second integrator 119 as long as the signal path is input a signal of angular velocity. Therefore, in the same way as the fifth exemplary embodiment, the spatial stabilization apparatus 100 of the sixth exemplary embodiment may include the first integrator 109, the second integrator 119, the first amplifier 111, the second amplifier 121, the first phase compensator 110 or the second phase compensator 120.

Seventh Exemplary Embodiment

Figure 7:
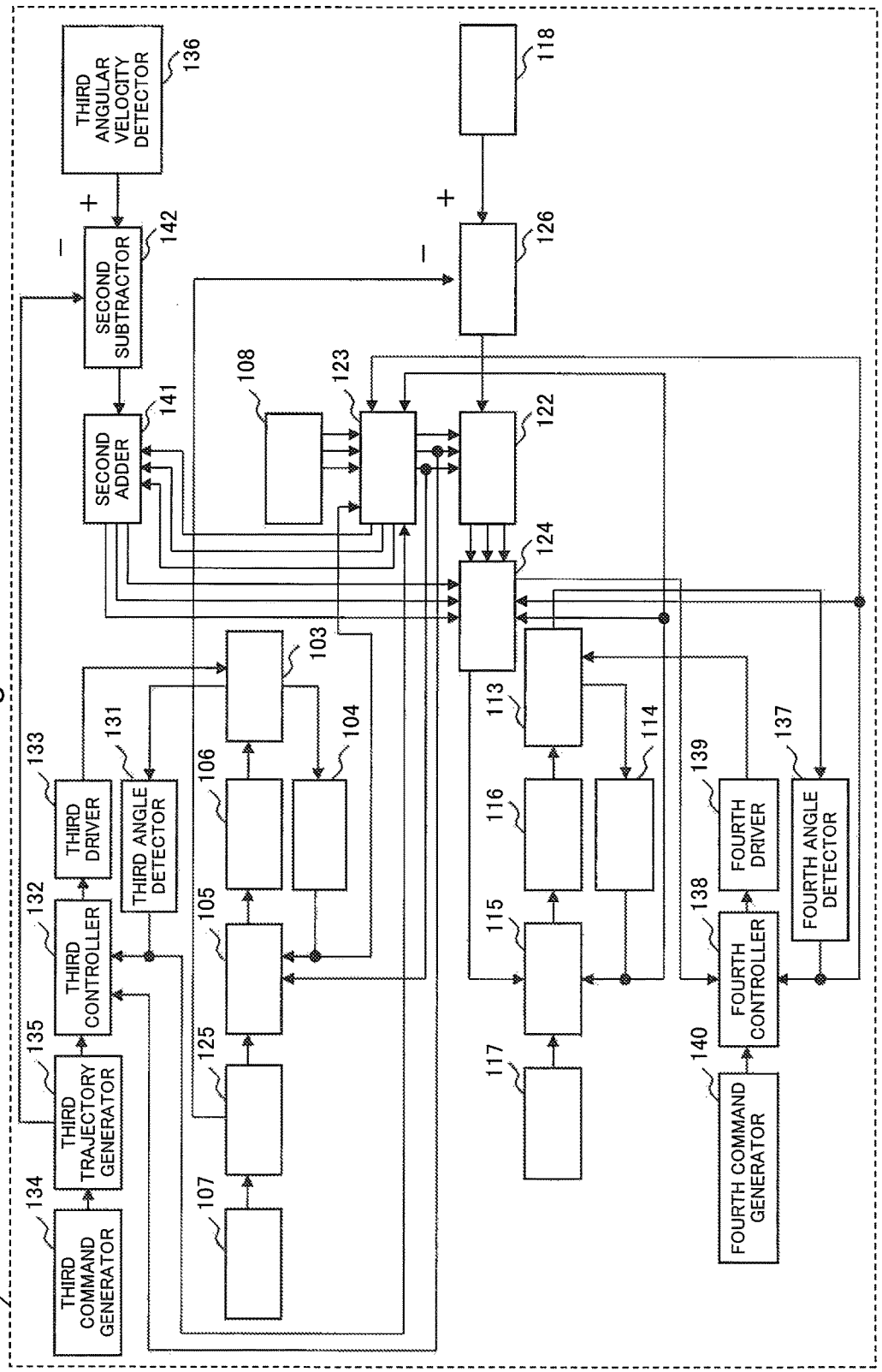
FIG. 7 is a block diagram showing a configuration of a spatial stabilization apparatus of a seventh exemplary embodiment of the present invention.

FIG. 7 is a block diagram showing a configuration of a spatial stabilization apparatus of a seventh exemplary embodiment of the present invention. The description of the seventh exemplary embodiment that is common with the first exemplary embodiment of the present invention will be omitted, thus, only differences of the seventh exemplary embodiment with reference to the first exemplary embodiment of the present invention will be described.

In the spatial stabilization apparatus 100 of the seventh exemplary embodiment, compared with the configuration of the first exemplary embodiment shown in FIG. 1, the first controlled object 103 is connected to another object in a manner rotatable around two axes and the second controlled object 113 is connected to the first controlled object 103 in a manner rotatable around two axes. One axis of the two rotation axes of the first controlled object 103 is referred to as a "first rotation axis" and the other, a "third rotation axis." One axis of the two rotation axes of the second controlled object 113 is referred to as a "second rotation axis" and the other, a "fourth rotation axis." It should be noted that the directions of the first rotation axis and the second rotation axis do not necessarily coincide with the directions of the third rotation axis and the fourth rotation axis.

Compared with the configuration of the first exemplary embodiment, the spatial stabilization apparatus 100 of the seventh exemplary embodiment further includes a third angle detector 131, a third controller 132, a third driver 133, a third command generator 134, and a third trajectory generator 135 that are a part of the control system of the third rotation axis of the first controlled object 103. The third angle detector 131, the third controller 132, the third driver 133, the third command generator 134, and the third trajectory generator 135 respectively have the same functions as the first angle detector 104, the first controller 105, the first driver 106, the first command generator 107, and the first trajectory generator 125 that are a part of the control system of the first rotation axis of the first controlled object 103.

Compared with the configuration of the first exemplary embodiment, the spatial stabilization apparatus 100 of the seventh exemplary embodiment further includes a third angular velocity detector 136, a second adder 141, and a second subtractor 142.

The third angular velocity detector 136 outputs a signal of controlled-object angular velocity as a temporal transition rate of the third angle. It should be noted that the third angular velocity detector 136 may be input a signal of the third angle that was output from the third angle detector 131 and output a time-differentiated third angle signal. Further, the third angular velocity detector 136 may configure a state estimator inside the third controller 132, which may generate a signal of an estimated value of angular velocity based on the third angle and a signal that controls the first controlled object 103 that is output from the third controller 132 and output the signal of the estimated value of the angular velocity.

The second subtractor 142 has the same function as the first subtractor 126. The second subtractor 142 subtracts a signal of a target angular velocity trajectory that is output from the third trajectory generator 135 from a signal of the current angular velocity that is output from the third angular velocity detector 136 and outputs a deviation signal from the target angular velocity based on the current angular velocity that is a derivative of the third angle.

The second adder 141 has the same function as the first adder 122, which adds a signal of the current angular velocity deviation of the third angle that is output from the second subtractor 142 and a signal obtained by converting the fluctuation angular velocity that is output from the first coordinate transformer 123 to Euler angle components in the first coordinate system and outputs a signal of the Euler angle components in the first coordinate system of residual fluctuation angular velocity relating to the rotation of the third angle (hereinafter, referred to as the "third residual fluctuation angular velocity").

Compared with the configuration of the first exemplary embodiment, the spatial stabilization apparatus 100 of the seventh exemplary embodiment further includes a fourth angle detector 137, a fourth controller 138, a fourth driver 139, and a fourth command generator 140 that are a part of the control system of the fourth rotation axis of the second controlled object 113. The fourth angle detector 137, the fourth controller 138, the fourth driver 139, and the fourth command generator 140 respectively have the same functions as the second angle detector 114, the second controller 115, the second driver 116, and the second command generator 117 that are a part of the control system of the second rotation axis of the second controlled object 113.

The inertial sensor 108 is fixed to the fixed part in the same way as the first exemplary embodiment, and the inertial sensor coordinate system coincides with the coordinate system 0. The first coordinate transformer 123 converts the input into the output in accordance with equations 15-16. The third angle is expressed as $\theta_{11}$. As the result, angular velocity in the inertial sensor coordinate system is converted to angular velocity in the coordinate system 1. Further, the second coordinate transformer 124 converts the input into the output in accordance with equations 17-18. The fourth angle is expressed as $\theta_{22}$. As the result, angular velocity in the coordinate system 1 is converted to angular velocity in the coordinate system 2.

$$[\omega_{x1}\omega_{y1}\omega_{z1}]^T = C^3(\psi_{11})[\omega_{xx1}\omega_{yy1}\omega_{zz1}]^T \quad \text{[Equation 15]}$$

$$[\omega_{xx1}\omega_{yy1}\omega_{zz1}]^T = C^1(\phi_1)C^2(\theta_1)C^3(\psi_1)[\omega_x\omega_y\omega_z]^T \quad \text{[Equation 16]}$$

$$[\omega_{x2}\omega_{y2}\omega_{z2}]^T = C^3(\psi_{22})[\omega_{xx2}\omega_{yy2}\omega_{zz2}]^T \quad \text{[Equation 17]}$$

$$[\omega_{xx2}\omega_{yy2}\omega_{zz2}]^T = C^1(\phi_2)C^2(\theta_2)C^3(\psi_2)[\omega_{xa1}\omega_{ya1}\omega_{za1}]^T \quad \text{[Equation 18]}$$

The first coordinate transformer 123 and the second coordinate transformer 124 may respectively perform coordinate transformation using the following equations 19 and 20 as relational equations of time derivatives of Euler angles using 1-2-3 Euler angle sequences instead of the equations 15-16 and the equations 17-18. It should be noted that the example shows a case in which the directions of two axes (y axis, z axis) out of the three axes in the inertial sensor coordinate system coincide with the directions of the third rotation axis and the first rotation axis.

$$\begin{bmatrix} \omega_{x1} \\ \omega_{y1} \\ \omega_{z1} \end{bmatrix} = \begin{bmatrix} \frac{\cos(\psi_1 + \psi_{11})}{\cos(\theta_1 + \theta_{11})} & -\frac{\sin(\psi_1 + \psi_{11})}{\cos(\theta_1 + \theta_{11})} & 0 \\ \sin(\psi_1 + \psi_{11}) & \cos(\psi_1 + \psi_{11}) & 0 \\ \cos(\psi_1 + \psi_{11}) & \sin(\psi_1 + \psi_{11}) & \\ -\frac{\sin(\theta_1 + \theta_{11})}{\cos(\theta_1 + \theta_{11})} & \frac{\sin(\theta_1 + \theta_{11})}{\cos(\theta_1 + \theta_{11})} & 1 \end{bmatrix} \begin{bmatrix} \omega_x \\ \omega_y \\ \omega_z \end{bmatrix}$$

[Equation 19]

$$\begin{bmatrix} \omega_{x2} \\ \omega_{y2} \\ \omega_{z2} \end{bmatrix} = \begin{bmatrix} \frac{\cos(\psi_2 + \psi_{22})}{\cos(\theta_2 + \theta_{22})} & -\frac{\sin(\psi_2 + \psi_{22})}{\cos(\theta_2 + \theta_{22})} & 0 \\ \sin(\psi_2 + \psi_{22}) & \cos(\psi_2 + \psi_{22}) & 0 \\ \cos(\psi_2 + \psi_{22}) & \sin(\psi_2 + \psi_{22}) & \\ -\frac{\sin(\theta_2 + \theta_{22})}{\cos(\theta_2 + \theta_{22})} & \frac{\sin(\theta_2 + \theta_{22})}{\cos(\theta_2 + \theta_{22})} & 1 \end{bmatrix} \begin{bmatrix} \omega_{xa1} \\ \omega_{ya1} \\ \omega_{za1} \end{bmatrix}$$

[Equation 20]

As described above, the spatial stabilization apparatus of the seventh exemplary embodiment can realize high spatial stability with a single inertial sensor. The reason is as follows: Using the output from the inertial sensor 108, the first controller 105 and the third controller 132, first, output a signal of a control command so as to cancel the respective fluctuation angles of the first rotation axis and the third rotation axis. As the result, the first controlled object 103 is controlled the angles of the first rotation axis and the third rotation axis such that the first controlled object 103 is spatially stabilized in relation to the inertial space. At the same time, the second controller 115 and the fourth controller 138 output a signal of a control command such that the residual fluctuation angle that could not be removed by the first controlled object 103 is cancelled. As the result, the second controlled object 113 is controlled the angles of the second rotation axis and the fourth rotation axis such that the second controlled object 113 is spatially stabilized in relation to the inertial space.

In the seventh exemplary embodiment, the angle trajectory that is output from the first trajectory generator 125 is the target angle for the first controller 105. Then, in the seventh exemplary embodiment, the first controller 105 performs an angle control by being input the first angle that is the output from the first angle detector 104 as the current angle and generating a control signal that controls the first angle of the first controlled object 103. Likewise, the second controller 115, the third controller 132, and the fourth controller 138 also perform an angle control. However, the seventh exemplary embodiment is not limited to the angle control, and the angular velocity that is output by the first trajectory generator 125 may be target angular velocity. Then, the first controller 105 may perform an angular velocity control by being input angular velocity obtained by differentiating the first angle that is the output from the first angle detector 104 as the current angular velocity and generating a control signal that controls the first angular velocity of the first controlled object 103. Likewise, the second controller 115, the third controller 132, and the fourth controller 138 may also perform an angular velocity control.

It should be noted that the differences from the first exemplary embodiment have been described in the seventh exemplary embodiment. However, in the same way as the first exemplary embodiment, the spatial stabilization apparatus 100 is not limited to the configuration without the first integrator 109, the second integrator 119, the first amplifier 111, the second amplifier 121, the first phase compensator 110 and the second phase compensator 120. The signal path, through which a feedback signal is output to the first controller 105 or the second controller 115, can adjust a phase (delay) and a gain of the signal as long as the signal path outputs angular velocity or angle. Alternatively, the signal path, through which a feedback signal is output to the first controller 105 or the second controller 115, can convert the signal of angular velocity to a signal of an angle using the first integrator 109 or the second integrator 119 as long as the signal path is input a signal of angular velocity. Therefore, in the same way as the fifth exemplary embodiment, the spatial stabilization apparatus 100 of the seventh exemplary embodiment may include the first integrator 109, the second integrator 119, the first amplifier 111, the second amplifier 121, the first phase compensator 110 or the second phase compensator 120. The spatial stabilization apparatus 100 of the seventh exemplary embodiment may also include an integrator, an amplifier, or a phase compensator for configuring a signal path that outputs a feedback signal to the third controller 132 or the fourth controller 138.

Eighth Exemplary Embodiment

The configuration of the spatial stabilization apparatus in the eighth exemplary embodiment of the present invention is the same as the configuration of the spatial stabilization apparatus in the seventh exemplary embodiment shown in FIG. 7 except for the configuration described below. The description of the eighth exemplary embodiment that is common with the seventh exemplary embodiment will be omitted, thus, only differences of the eighth exemplary embodiment with reference to the seventh exemplary embodiment will be described.

In the eighth exemplary embodiment of the present invention, with reference to the configuration shown in FIG. 7, a signal from the second angle detector 114 to the first coordinate transformer 123, a signal from the fourth angle detector 137 to the first coordinate transformer 123, and a signal from the first angle detector 104 to the first coordinate transformer 123 are not necessary.

While the inertial sensor 108 is fixed to the fixed part in the seventh exemplary embodiment of the present invention, the inertial sensor 108 is fixed to the first controlled object 103 in the eighth exemplary embodiment. As such, the first controller 105 is input a signal of a first angle component of the angular velocity obtained by converting fluctuation angular velocity that is output from the inertial sensor 108 to Euler angle components in the first coordinate system by the first coordinate transformer 123. Further, the third controller 132 is input a signal of a third angle component of the angular velocity obtained by converting fluctuation angular velocity that is output from the inertial sensor 108 to Euler angle components in the first coordinate system by the first coordinate transformer 123. The first coordinate transformer 123 converts the input into the output in accordance with the equation 21. As the result, angular velocity in the inertial sensor coordinate system is converted to angular velocity in the coordinate system 1.

$$[\omega_{x1} \omega_{y1} \omega_{z1}]^T = [\omega_x \omega_y \omega_z]^T$$

[Equation 21]

The first coordinate transformer 123 may perform coordinate transformation using the following equation 22 as a relational equation of a time derivative of Euler angles using 1-2-3 Euler angle sequences instead of the equation 21, while the equation 22 and the equation 21 are the same.

$$[\omega_{x1}\ \omega_{y1}\ \omega_{z1}]^T = [\omega_x\ \omega_y\ \omega_z]^T \qquad \text{[Equation 22]}$$

As described above, the spatial stabilization apparatus of the eighth exemplary embodiment can realize high spatial stability with a single inertial sensor. The reason is as follows: Using the output from the inertial sensor 108, both the first controller 105 and the third controller 132, first, output a signal of a control command so as to cancel the respective fluctuation angles of the first rotation axis and the third rotation axis. As the result, the first controlled object 103 is controlled the angles of the first rotation axis and the third rotation axis such that the first controlled object 103 is spatially stabilized in relation to the inertial space. At the same time, both the second controller 115 and the fourth controller 138 output a signal of a control command such that the residual fluctuation angle that could not be removed by the first controlled object 103 is cancelled. As the result, the second controlled object 113 is controlled the angles of the second rotation axis and the fourth rotation axis such that the second controlled object 113 is spatially stabilized in relation to the inertial space.

Ninth Exemplary Embodiment

The configuration of the spatial stabilization apparatus in the ninth exemplary embodiment of the present invention is the same as the configuration of the spatial stabilization apparatus in the seventh exemplary embodiment shown in FIG. 7. The description of the ninth exemplary embodiment that is common with the seventh exemplary embodiment will be omitted, thus, only differences of the ninth exemplary embodiment with reference to the seventh exemplary embodiment will be described.

While, the inertial sensor 108 is fixed to the fixed part in the seventh exemplary embodiment of the present invention, the inertial sensor 108 is fixed to the second controlled object 113 in the ninth exemplary embodiment. As such, the second controller 115 is input a signal of a second angle component of the angular velocity obtained by converting fluctuation angular velocity that is output from the inertial sensor 108 to Euler angle components in the second coordinate system by the second coordinate transformer 124. Further, the fourth controller 138 is input a signal of a fourth angle component of the angular velocity obtained by converting fluctuation angular velocity that is output from the inertial sensor 108 to Euler angle components in the second coordinate system by the second coordinate transformer 124. The second coordinate transformer 124 converts the input into the output in accordance with the equation 23. As the result, angular velocity in the inertial sensor coordinate system is converted to angular velocity in the coordinate system 2.

$$[\omega_{x1}\ \omega_{y1}\ \omega_{z1}]^T = \{C^3(\psi_{22})\}^{-1}[\omega_x\ \omega_y\ \omega_z]^T \qquad \text{[Equation 23]}$$

It should be noted that the second coordinate transformer 124 may perform coordinate transformation using the following equation 24 as a relational equation of a time derivative of Euler angles using 1-2-3 Euler angle sequences instead of the equation 23.

$$[\omega_{x1}\ \omega_{y1}\ \omega_{z1}]^T = \begin{bmatrix} \cos(-\psi_{22}) & -\sin(-\psi_{22}) & 0 \\ \sin(-\psi_{22}) & \cos(-\psi_{22}) & 0 \\ 0 & 0 & 1 \end{bmatrix} [\omega_x\ \omega_y\ \omega_z]^T \qquad \text{[Equation 24]}$$

As described above, the spatial stabilization apparatus of the ninth exemplary embodiment can realize high spatial stability with a single inertial sensor. The reason is as follows: Using the output from the inertial sensor 108, both the first controller 105 and the third controller 132, first, output a signal of a control command so as to cancel the respective fluctuation angles of the first rotation axis and the third rotation axis. As the result, the first controlled object 103 is controlled the respective angles of the first rotation axis and the third rotation axis such that the first controlled object 103 is spatially stabilized in relation to the inertial space. At the same time, both the second controller 115 and the fourth controller 138 output a signal of a control command such that the residual fluctuation angle that could not be removed by the first controlled object 103 is cancelled. As the result, the second controlled object 113 is controlled the respective angles of the second rotation axis and the fourth rotation axis such that the second controlled object 113 is spatially stabilized in relation to the inertial space.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

[Supplementary Note 1]

A spatial stabilization apparatus including:

a first controlled object that is connected to a moving body in a manner rotatable around a first rotation axis;

a second controlled object that is connected to the first controlled object in a manner rotatable around a second rotation axis;

inertial detection means that measures angular velocity of either the moving body or the first controlled object, is fixed to either the moving body or the first controlled object, and outputs a first detected angular velocity signal of the first controlled object;

first angular velocity detection means that outputs an angular velocity estimated signal that is estimated or detected angular velocity with respect to a first angle of the first controlled object in relation to the moving body;

first command generation means that outputs a target angle signal of the first angle;

second command generation means that outputs a target angle signal of a second angle of the second controlled object in relation to the first controlled object;

first addition means that adds a signal based on the angular velocity estimated signal and a signal based on the first detected angular velocity signal and outputs a second detected angular velocity signal;

first control means that controls the first angle based on a signal based on the target angle signal of the first angle and a signal based on the first detected angular velocity signal; and second control means that controls the second angle based on a signal based on the target angle signal of the second angle and a signal based on the second detected angular velocity signal.

[Supplementary Note 2]

The spatial stabilization apparatus according to Supplementary Note 1 further including:

first angle detection means that detects the first angle of the first controlled object in relation to the moving body and outputs a first angle detected signal; and second angle detection means that detects the second angle of the second controlled object in relation to the first controlled object and outputs a second angle detected signal.

[Supplementary Note 3]

The spatial stabilization apparatus according to either Supplementary Note 1 or 2 including:

first coordinate transformation means that is input the first detected angular velocity signal and the first angle detected signal or the second angle detected signal, converts the first detected angular velocity signal into one or more Euler angle components including a component relating to the first angle, and outputs a signal based on the first detected angular velocity signal.

[Supplementary Note 4]

The spatial stabilization apparatus according to any one of Supplementary Notes 1 to 3 including:

second coordinate transformation means that is input the second detected angular velocity signal and the second angle detected signal, converts the second detected angular velocity signal into one or more Euler angle components including a component relating to the second angle, and outputs one or more components of a signal based on the second detected angular velocity signal.

[Supplementary Note 5]

The spatial stabilization apparatus according to any one of Supplementary Notes 1 to 4 including:

first trajectory generation means that is input a signal of a target angle of the first angle that is output from the first command generation means and outputs a signal based on a first target angle signal that is an angle trajectory to reach the first target angle and the target angle signal of the first angle that is an angular velocity trajectory corresponding to the angle trajectory; and first subtraction means that subtracts a signal based on the target angle signal of the first angle from the angular velocity estimated signal and outputs a deviation angular velocity signal.

[Supplementary Note 6]

The spatial stabilization apparatus according to any one of Supplementary Notes 1 to 5 further including:

first integration means that time-integrates one component of the first detected angular velocity signal and outputs one component of a first detected angle signal to the first control means; and second integration means that time-integrates one component of the second detected angular velocity signal and outputs one component of a second detected angle signal to the second control means.

[Supplementary Note 7]

The spatial stabilization apparatus according to any one of Supplementary Notes 1 to 6 further including:

first phase compensation means that outputs a signal obtained by changing a phase of one component of a signal based on the first detected angular velocity signal in accordance with a preset first value;

first amplification means that outputs a signal obtained by changing a gain of a signal that is output by the first phase compensation means in accordance with a preset second value to the first integration means;

second phase compensation means that outputs a signal obtained by changing a phase of one component of a signal based on the second detected angular velocity signal in accordance with a preset third value; and second amplification means that outputs a signal obtained by changing a gain of a signal that is output by the second phase compensation means in accordance with a preset fourth value to the second integration means.

[Supplementary Note 8]

The spatial stabilization apparatus according to Supplementary Note 7 further including:

third phase compensation means that outputs a signal obtained by changing a phase of one component of a signal based on the first detected angular velocity signal in accordance with a preset fifth value;

third amplification means that outputs a signal obtained by changing a gain of a signal that is output by the third phase compensation means in accordance with a preset sixth value to the first control means;

fourth phase compensation means that outputs a signal obtained by changing a phase of one component of a signal based on the second detected angular velocity signal in accordance with a preset seventh value; and fourth amplification means that outputs a signal obtained by changing a gain of a signal that is output by the fourth phase compensation means in accordance with a preset eighth value to the second control means.

[Supplementary Note 9]

A non-volatile storage medium for storing a spatial stabilization program that causes a computer equipped in a spatial stabilization apparatus that includes a first controlled object that is connected to a moving body in a manner rotatable around a first rotation axis and a second controlled object that is connected to the first controlled object in a manner rotatable around a second rotation axis to function as:

inertial detection means that measures angular velocity of either the moving body or the first controlled object and outputs a first detected angular velocity signal that includes one or more components out of three components of an orthogonal coordinate system that is fixed to either the moving body or the first controlled object;

first angular velocity detection means that outputs an angular velocity estimated signal that is estimated or detected angular velocity with respect to a first angle of the first controlled object in relation to the moving body;

first command generation means that outputs a target angle signal of the first angle;

second command generation means that outputs a target angle signal of a second angle of the second controlled object in relation to the first controlled object;

first addition means that adds a signal based on the angular velocity estimated signal and a signal based on the first detected angular velocity signal and outputs a second detected angular velocity signal;

first control means that controls the first angle based on a signal based on the target angle signal of the first angle and a signal based on the first detected angular velocity signal; and second control means that controls the second angle based on a signal based on the target angle signal of the second angle and a signal based on the second detected angular velocity signal.

[Supplementary Note 10]

A spatial stabilization method including:

detecting a first angle of a first controlled object that is connected to a moving body in a manner rotatable around a first rotation axis with reference to the another object and outputting a first angle detected signal;

detecting a second angle of a second controlled object that is connected to the first controlled object in a manner rotatable around a second rotation axis with reference to the first controlled object and outputting a second angle detected signal;

measuring angular velocity of either the moving body or the first controlled object and outputting a first detected angular velocity signal that includes one or more components out of three components of an orthogonal coordinate system that is fixed to either the moving body or the first controlled object;

outputting an angular velocity estimated signal that is estimated or detected angular velocity with respect to a first angle of the first controlled object in relation to the moving body;

outputting a target angle signal of the first angle;

outputting a target angle signal of a second angle of the second controlled object in relation to the first controlled object;

adding a signal based on the angular velocity estimated signal and a signal based on the first detected angular velocity signal and outputting a second detected angular velocity signal;

controlling the first angle based on a signal based on the target angle signal of the first angle and a signal based on the first detected angular velocity signal; and controlling the second angle based on a signal based on the target angle signal of the second angle and a signal based on the second detected angular velocity signal.

[Supplementary Note 11]

The spatial stabilization apparatus according to any one of Supplementary Notes 1 to 8 wherein the inertial detection means is fixed to the moving body.

[Supplementary Note 12]

The spatial stabilization apparatus according to any one of Supplementary Notes 1 to 8 wherein the inertial detection means is fixed to the first controlled object.

[Supplementary Note 13]

The spatial stabilization apparatus according to any one of Supplementary Notes 1 to 8 wherein the inertial detection means is fixed to the second controlled object.

[Supplementary Note 14]

The spatial stabilization apparatus according to any one of Supplementary Notes 1 to 8 wherein estimation relating to the first angle of the first controlled object with reference to the moving body is a signal based on the angular velocity that is calculated by differentiating the first angle.

[Supplementary Note 15]

The spatial stabilization apparatus according to any one of Supplementary Notes 1 to 8 wherein the first angular velocity detection means further has estimation means that estimates angular velocity relating to the first angle of the first controlled object, and estimation relating to the first angle of the first controlled object with reference to the moving body is a signal based on the angular velocity that is estimated by the estimation means.

[Supplementary Note 16]

The spatial stabilization apparatus according to any one of Supplementary Notes 1 to 8 wherein the first angular velocity detection means further has estimation means that estimates angular velocity relating to the first angle of the first controlled object, and the angular velocity estimated signal that is the detected angular velocity is a signal based on the angular velocity that is estimated by the estimation means.

[Supplementary Note 17]

The spatial stabilization apparatus according to any one of Supplementary Notes 1 to 8 wherein the spatial stabilization apparatus according to the any one of Supplementary Notes 1 to 8 further has angular velocity detection means for the first angle of the first controlled object, and the angular velocity estimated signal that is the detected angular velocity is angular velocity that is calculated by the angular velocity detection means.

This application is based upon and claims the benefit of priority from Japanese patent application No. 2013-031235, filed on Feb. 20, 2013, the disclosure of which is incorporated herein in its entirety by reference.

What is claimed is:

1. A spatial stabilization apparatus comprising:
a first controlled object that is connected to a moving body in a manner rotatable around a first rotation axis;
a second controlled object that is connected to the first controlled object in a manner rotatable around a second rotation axis;
an inertial detection unit that measures angular velocity of either the moving body or the first controlled object and outputs a first detected angular velocity signal that includes one or more components out of three components of an orthogonal coordinate system that is fixed to either the moving body or the first controlled object;
a first angular velocity detection unit that outputs an angular velocity estimated signal that is estimated or detected angular velocity with respect to a first angle of the first controlled object in relation to the moving body;
a first command generation unit that outputs a target angle signal of the first angle;
a second command generation unit that outputs a target angle signal of a second angle of the second controlled object in relation to the first controlled object;
a first addition unit that adds a signal based on the angular velocity estimated signal and a signal based on the first detected angular velocity signal and outputs a second detected angular velocity signal;
a first control unit that controls the first angle based on a signal based on the target angle signal of the first angle and a signal based on the first detected angular velocity signal;
a second control unit that controls the second angle based on a signal based on the target angle signal of the second angle and a signal based on the second detected angular velocity signal; and
a second coordinate transformation unit that is input the second detected angular velocity signal and the second angle detected signal, converts the second detected angular velocity signal into one or more Euler angle components including a component relating to the second angle, and outputs one or more components of a signal based on the second detected angular velocity signal.

2. The spatial stabilization apparatus according to claim 1 further comprising:
a first angle detection unit that detects the first angle of the first controlled object in relation to the moving body and outputs a first angle detected signal; and
a second angle detection unit that detects the second angle of the second controlled object in relation to the first controlled object and outputs a second angle detected signal.

3. The spatial stabilization apparatus according to claim 1 further comprising:

a first coordinate transformation unit that is input the first detected angular velocity signal and the first angle detected signal or the second angle detected signal, converts the first detected angular velocity signal into one or more Euler angle components including a component relating to the first angle, and outputs a signal based on the first detected angular velocity signal.

4. The spatial stabilization apparatus according to claim 1 further comprising:
a first trajectory generation unit that is input a signal of a target angle of the first angle that is output from the first command generation unit and outputs a signal based on a first target angle signal that is an angle trajectory to reach the first target angle and the target angle signal of the first angle that is an angular velocity trajectory corresponding to the angle trajectory; and
a first subtraction unit that subtracts a signal based on the target angle signal of the first angle from the angular velocity estimated signal and outputs a deviation angular velocity signal.

5. The spatial stabilization apparatus according to claim 1 further comprising:
a first integration unit that time-integrates one component of the first detected angular velocity signal and outputs one component of a first detected angle signal to the first control unit; and
a second integration unit that time-integrates one component of the second detected angular velocity signal and outputs one component of a second detected angle signal to the second control unit.

6. The spatial stabilization apparatus according to claim 1 further comprising:
a first phase compensation unit that outputs a signal obtained by changing a phase of one component of a signal based on the first detected angular velocity signal in accordance with a preset first value;
a first amplification unit that outputs a signal obtained by changing a gain of a signal that is output by the first phase compensation unit in accordance with a preset second value to the first integration unit;
a second phase compensation unit that outputs a signal obtained by changing a phase of one component of a signal based on the second detected angular velocity signal in accordance with a preset third value; and
a second amplification unit that outputs a signal obtained by changing a gain of a signal that is output by the second phase compensation unit in accordance with a preset fourth value to the second integration unit.

7. The spatial stabilization apparatus according to claim 6 further comprising:
a third phase compensation unit that outputs a signal obtained by changing a phase of one component of a signal based on the first detected angular velocity signal in accordance with a preset fifth value;
a third amplification unit that outputs a signal obtained by changing a gain of a signal that is output by the third phase compensation unit in accordance with a preset sixth value to the first control unit;
a fourth phase compensation unit that outputs a signal obtained by changing a phase of one component of a signal based on the second detected angular velocity signal in accordance with a preset seventh value; and
a fourth amplification unit that outputs a signal obtained by changing a gain of a signal that is output by the fourth phase compensation unit in accordance with a preset eighth value to the second control unit.

8. A non-volatile storage medium for storing a spatial stabilization program that causes a computer equipped in a spatial stabilization apparatus that comprises a first controlled object that is connected to a moving body in a manner rotatable around a first rotation axis and a second controlled object that is connected to the first controlled object in a manner rotatable around a second rotation axis to function as:
an inertial detection unit that measures angular velocity of either the moving body or the first controlled object and outputs a first detected angular velocity signal that includes one or more components out of three components of an orthogonal coordinate system that is fixed to either the moving body or the first controlled object;
a first angular velocity detection unit that outputs an angular velocity estimated signal that is estimated or detected angular velocity with respect to a first angle of the first controlled object in relation to the moving body;
a first command generation unit that outputs a target angle signal of the first angle;
a second command generation unit that outputs a target angle signal of a second angle of the second controlled object in relation to the first controlled object;
a first addition unit that adds a signal based on the angular velocity estimated signal and a signal based on the first detected angular velocity signal and outputs a second detected angular velocity signal;
a first control unit that controls the first angle based on a signal based on the target angle signal of the first angle and a signal based on the first detected angular velocity signal;
a second control unit that controls the second angle based on a signal based on the target angle signal of the second angle and a signal based on the second detected angular velocity signal; and
a second coordinate transformation unit that is input the second detected angular velocity signal and the second angle detected signal, converts the second detected angular velocity signal into one or more Euler angle components including a component relating to the second angle, and outputs one or more components of a signal based on the second detected angular velocity signal.

9. A spatial stabilization method comprising:
detecting a first angle of a first controlled object that is connected to a moving body in a manner rotatable around a first rotation axis with reference to the moving body and outputting a first angle detected signal;
detecting a second angle of a second controlled object that is connected to the first controlled object in a manner rotatable around a second rotation axis with reference to the first controlled object and outputting a second angle detected signal;
measuring angular velocity of either the moving body or the first controlled object and outputting a first detected angular velocity signal that includes one or more components out of three components of an orthogonal coordinate system that is fixed to either the moving body or the first controlled object;
outputting an angular velocity estimated signal that is estimated or detected angular velocity with respect to a first angle of the first controlled object in relation to the moving body;
outputting a target angle signal of the first angle;

outputting a target angle signal of the second angle of the second controlled object in relation to the first controlled object;

adding a signal based on the angular velocity estimated signal and a signal based on the first detected angular velocity signal and outputting a second detected angular velocity signal;

controlling the first angle based on a signal based on the target angle signal of the first angle and a signal based on the first detected angular velocity signal;

controlling the second angle based on a signal based on the target angle signal of the second angle and a signal based on the second detected angular velocity signal; and inputting the second detected angular velocity signal and the second angle detected signal, converting the second detected angular velocity signal into one or more Euler angle components including a component relating to the second angle, and outputting one or more components of a signal based on the second detected angular velocity signal.

10. The spatial stabilization apparatus according to claim 2 further comprising:

a first coordinate transformation unit that is input the first detected angular velocity signal and the first angle detected signal or the second angle detected signal, converts the first detected angular velocity signal into one or more Euler angle components including a component relating to the first angle, and outputs a signal based on the first detected angular velocity signal.

11. The spatial stabilization apparatus according to claim 2 further comprising:

a first trajectory generation unit that is input a signal of a target angle of the first angle that is output from the first command generation unit and outputs a signal based on a first target angle signal that is an angle trajectory to reach the first target angle and the target angle signal of the first angle that is an angular velocity trajectory corresponding to the angle trajectory; and a first subtraction unit that subtracts a signal based on the target angle signal of the first angle from the angular velocity estimated signal and outputs a deviation angular velocity signal.

12. The spatial stabilization apparatus according to claim 3 further comprising:

a first trajectory generation unit that is input a signal of a target angle of the first angle that is output from the first command generation unit and outputs a signal based on a first target angle signal that is an angle trajectory to reach the first target angle and the target angle signal of the first angle that is an angular velocity trajectory corresponding to the angle trajectory; and a first subtraction unit that subtracts a signal based on the target angle signal of the first angle from the angular velocity estimated signal and outputs a deviation angular velocity signal.

13. The spatial stabilization apparatus according to claim 10 further comprising:

a first trajectory generation unit that is input a signal of a target angle of the first angle that is output from the first command generation unit and outputs a signal based on a first target angle signal that is an angle trajectory to reach the first target angle and the target angle signal of the first angle that is an angular velocity trajectory corresponding to the angle trajectory; and a first subtraction unit that subtracts a signal based on the target angle signal of the first angle from the angular velocity estimated signal and outputs a deviation angular velocity signal.

* * * * *